(12) United States Patent
Monahan et al.

(10) Patent No.: US 11,460,373 B2
(45) Date of Patent: Oct. 4, 2022

(54) PORTABLE TEST STAND FOR AIRCRAFT ENGINES

(71) Applicant: PRATT & WHITNEY CANADA CORP., Longueuil (CA)

(72) Inventors: Douglas Monahan, Saint-Constant (CA); Gabor Kafka, Ste-Anne-de-Bellevue (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 53 days.

(21) Appl. No.: 17/013,018

(22) Filed: Sep. 4, 2020

(65) Prior Publication Data

US 2022/0074815 A1 Mar. 10, 2022

(51) Int. Cl.
*G01M 15/14* (2006.01)
*G01M 15/02* (2006.01)

(52) U.S. Cl.
CPC ............ *G01M 15/02* (2013.01); *G01M 15/14* (2013.01)

(58) Field of Classification Search
CPC .............................. G01M 15/02; G01M 15/14
See application file for complete search history.

(56) References Cited

U.S. PATENT DOCUMENTS

| | | | | |
|---|---|---|---|---|
| 2,823,756 A * | 2/1958 | Bridge | ...................... | B64F 1/26 181/203 |
| 3,194,485 A * | 7/1965 | Ulmann | ..................... | F02C 6/04 417/86 |
| 4,258,823 A * | 3/1981 | Ganz | ....................... | F02C 7/045 181/214 |
| 4,328,703 A * | 5/1982 | McClure | ................. | G01L 5/133 73/112.04 |
| 4,848,717 A * | 7/1989 | Bevill | ................... | B25H 1/0007 248/670 |
| 5,575,607 A | 11/1996 | Grout et al. | | |
| 5,851,007 A * | 12/1998 | Swartzlander | ........ | G01M 15/02 269/17 |

(Continued)

FOREIGN PATENT DOCUMENTS

| | | |
|---|---|---|
| CN | 110873647 A | 3/2020 |
| FR | 3070202 B1 | 9/2019 |

OTHER PUBLICATIONS

"Aircraft Engine Transportation from Aviation Express", Oct. 6, 2014 (Oct. 6, 2014), XP055879418, Retrieved from the Internet: URL:https://www.youtube.com/watch?v=lf9l2ka7IKo.

(Continued)

*Primary Examiner* — Eric S. McCall
(74) *Attorney, Agent, or Firm* — Norton Rose Fulbright Canada LLP.

(57) ABSTRACT

A portable attitude test stand (PATS) for an aircraft engine, has: a support frame mountable on a trailer of a road vehicle; a test cell supported by the support frame and sized to receive the aircraft engine, the test cell operable to rotate the aircraft engine about a pitch axis and a roll axis of the aircraft engine; and an actuator operatively connected to the test cell and to the support frame, the actuator operable to lower and raise the test cell relative to the support frame between a transport configuration in which the test cell has a transport height and a test configuration in which the test cell has a test height, the test height being greater than the transport height.

18 Claims, 15 Drawing Sheets

(56) References Cited

U.S. PATENT DOCUMENTS

| | | | |
|---|---|---|---|
| 7,726,182 B1* | 6/2010 | Newlin | G01M 15/02 |
| | | | 73/116.02 |
| 8,220,769 B2 | 7/2012 | Mainville et al. | |
| D856,626 S* | 8/2019 | Freilich | D34/31 |
| 2005/0044933 A1* | 3/2005 | Laws | G01M 15/046 |
| | | | 73/114.24 |
| 2012/0289928 A1* | 11/2012 | Wright | A61M 1/3626 |
| | | | 604/500 |
| 2018/0179913 A1 | 6/2018 | Harral | |
| 2018/0347405 A1* | 12/2018 | Schmidt | B64F 5/60 |
| 2020/0348209 A1* | 11/2020 | Pfister | G01M 15/04 |

OTHER PUBLICATIONS

European Search Report dated Jan. 25, 2022 in counterpart EP application No. 21194920.1.

\* cited by examiner

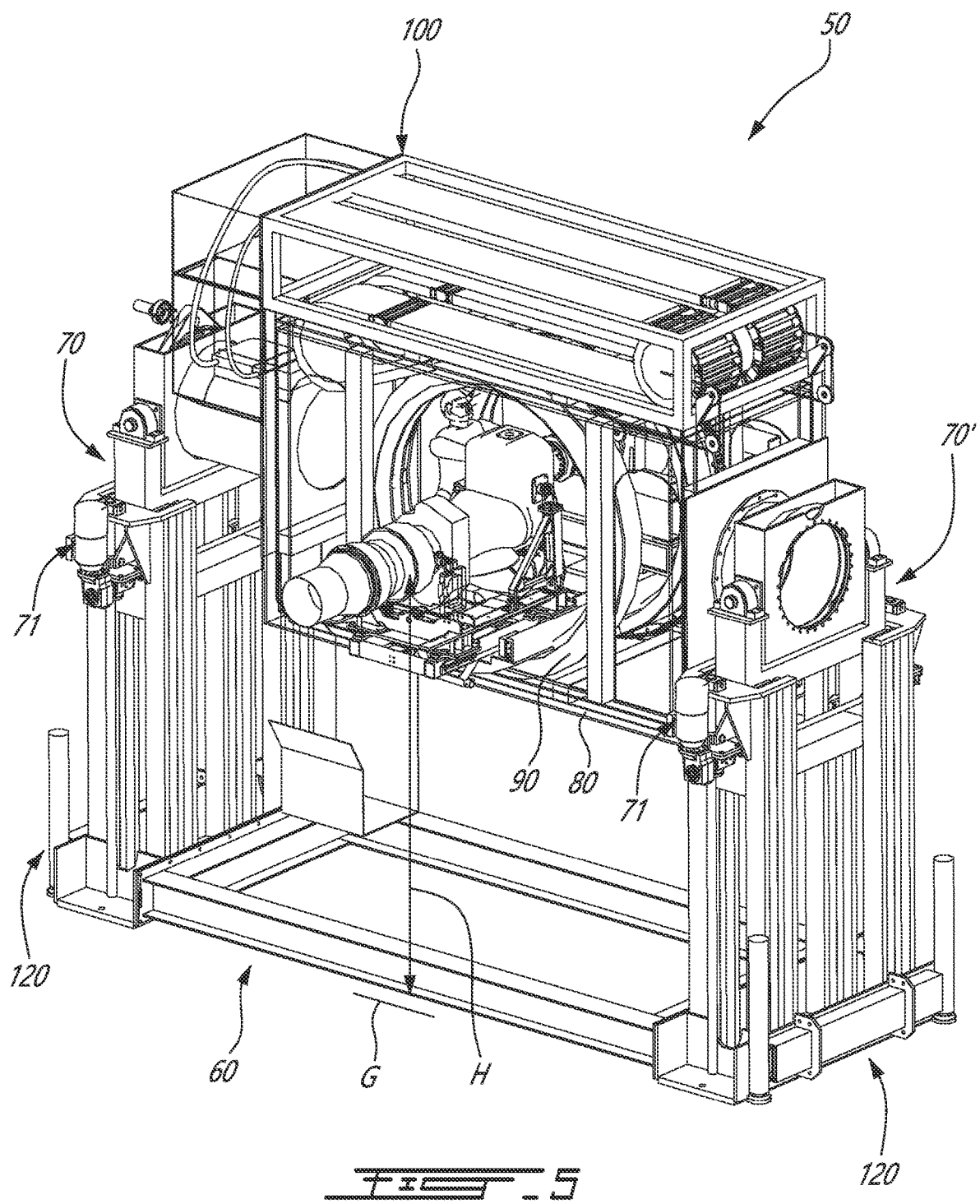

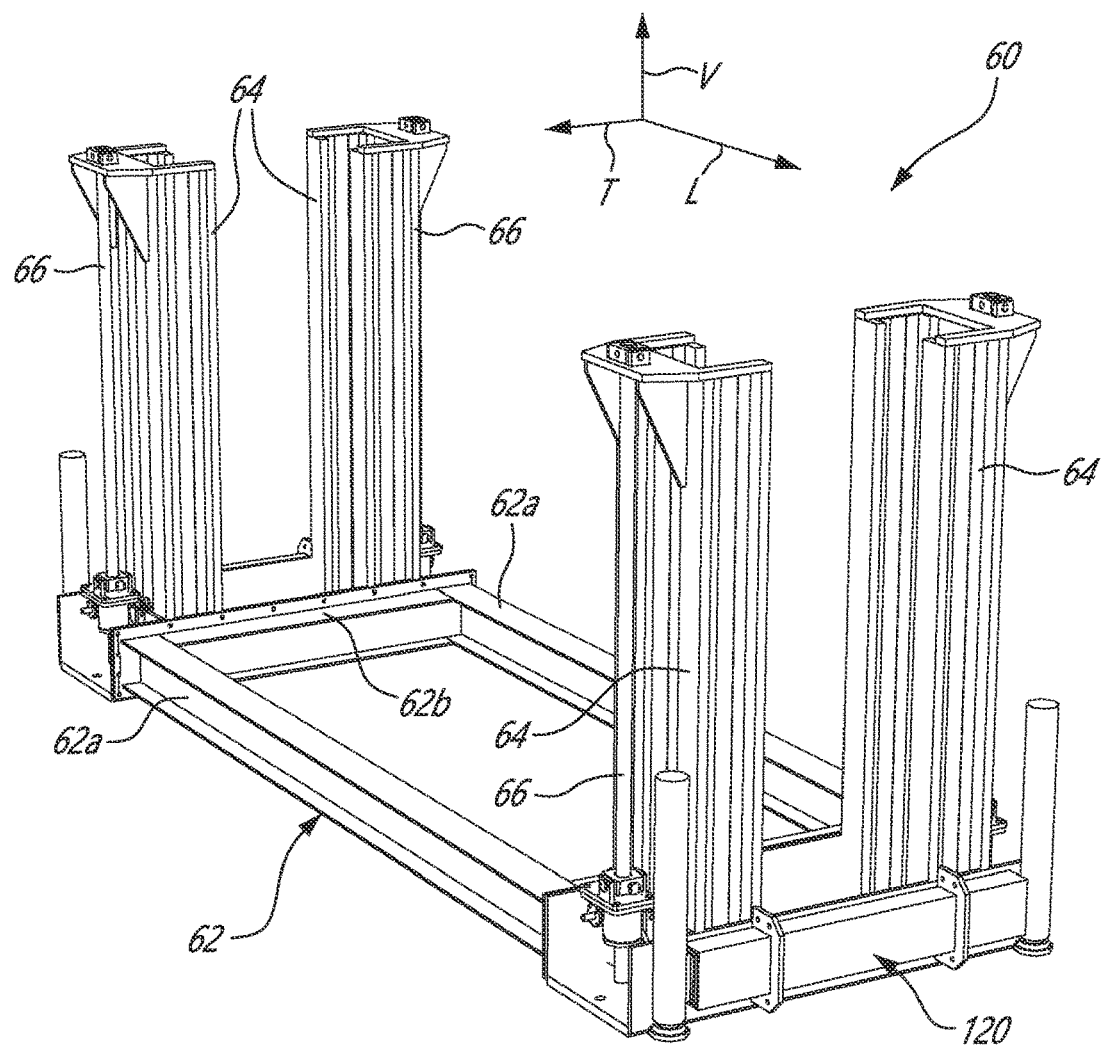
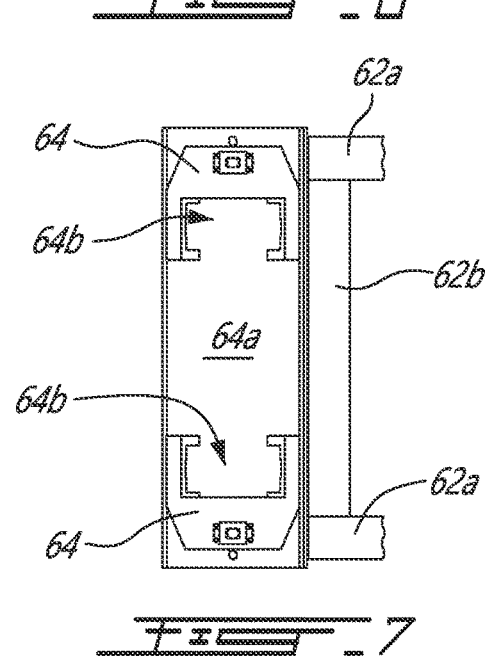

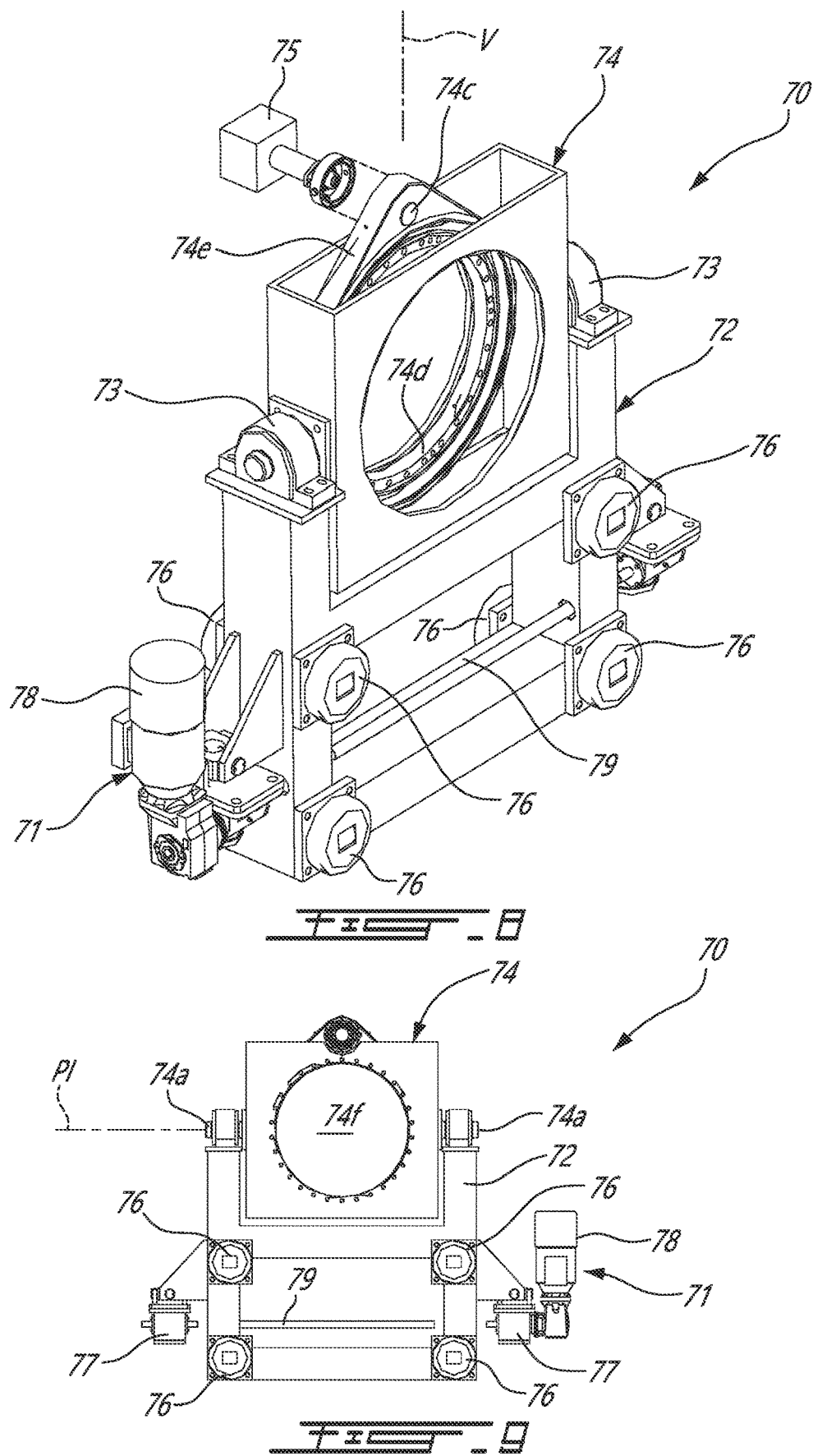

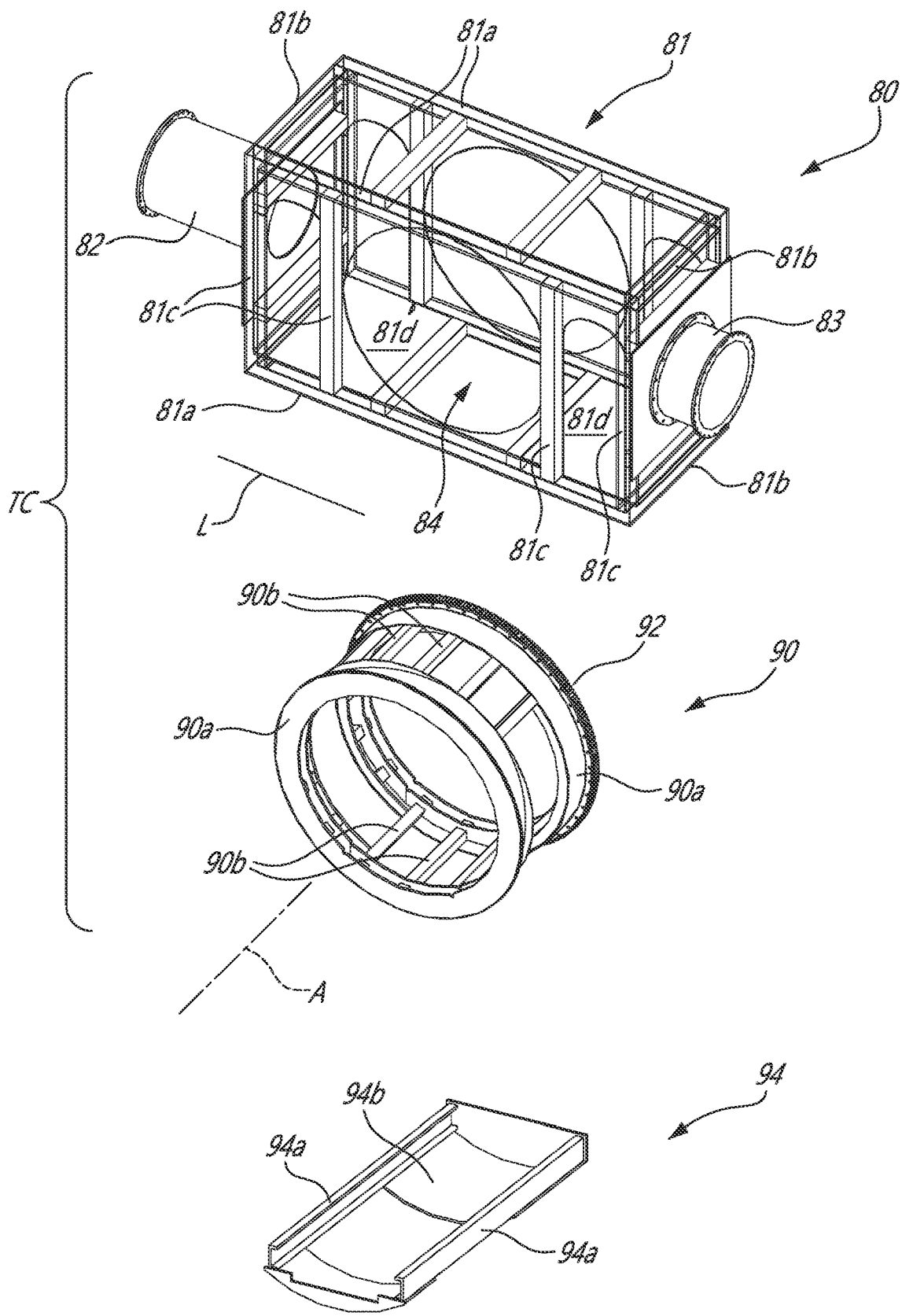

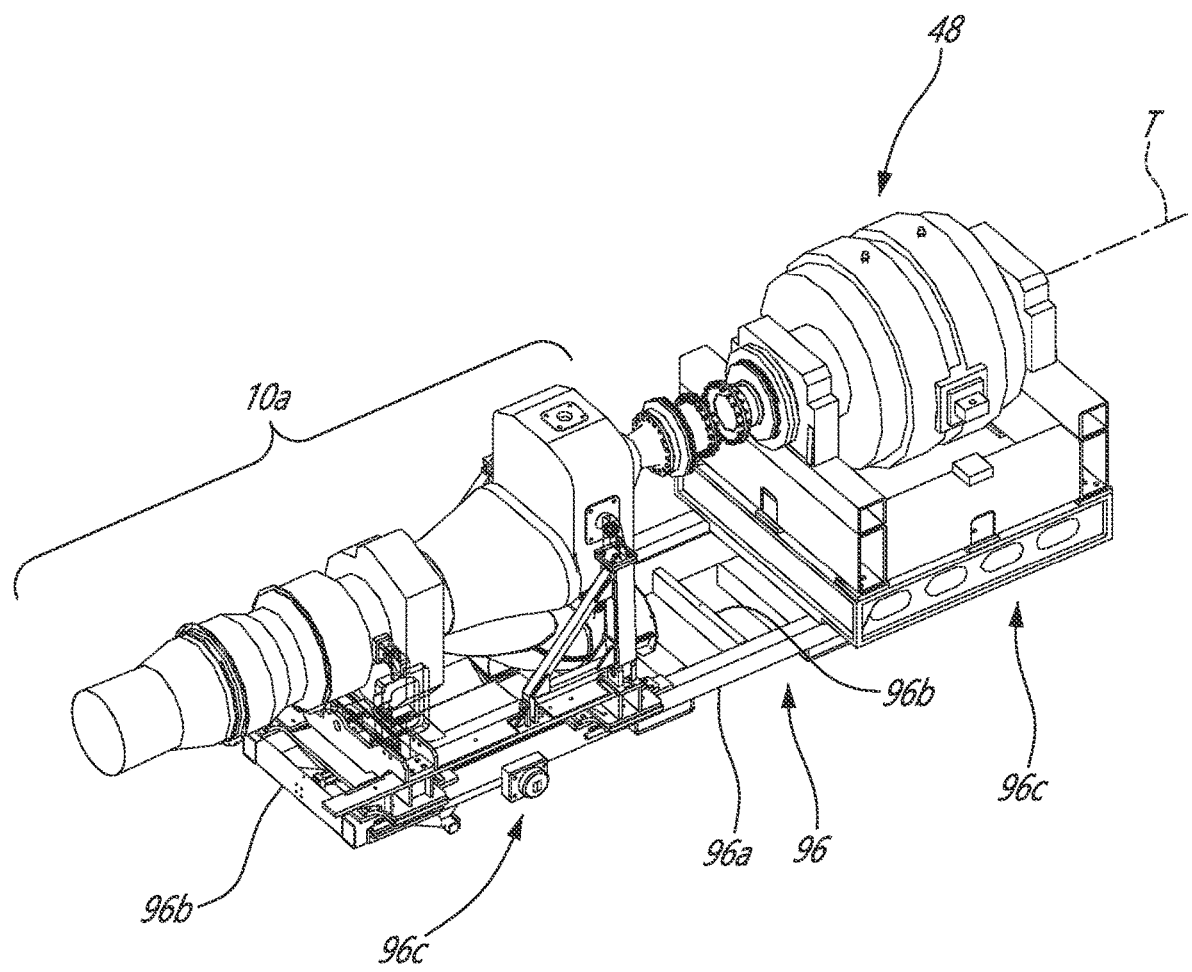

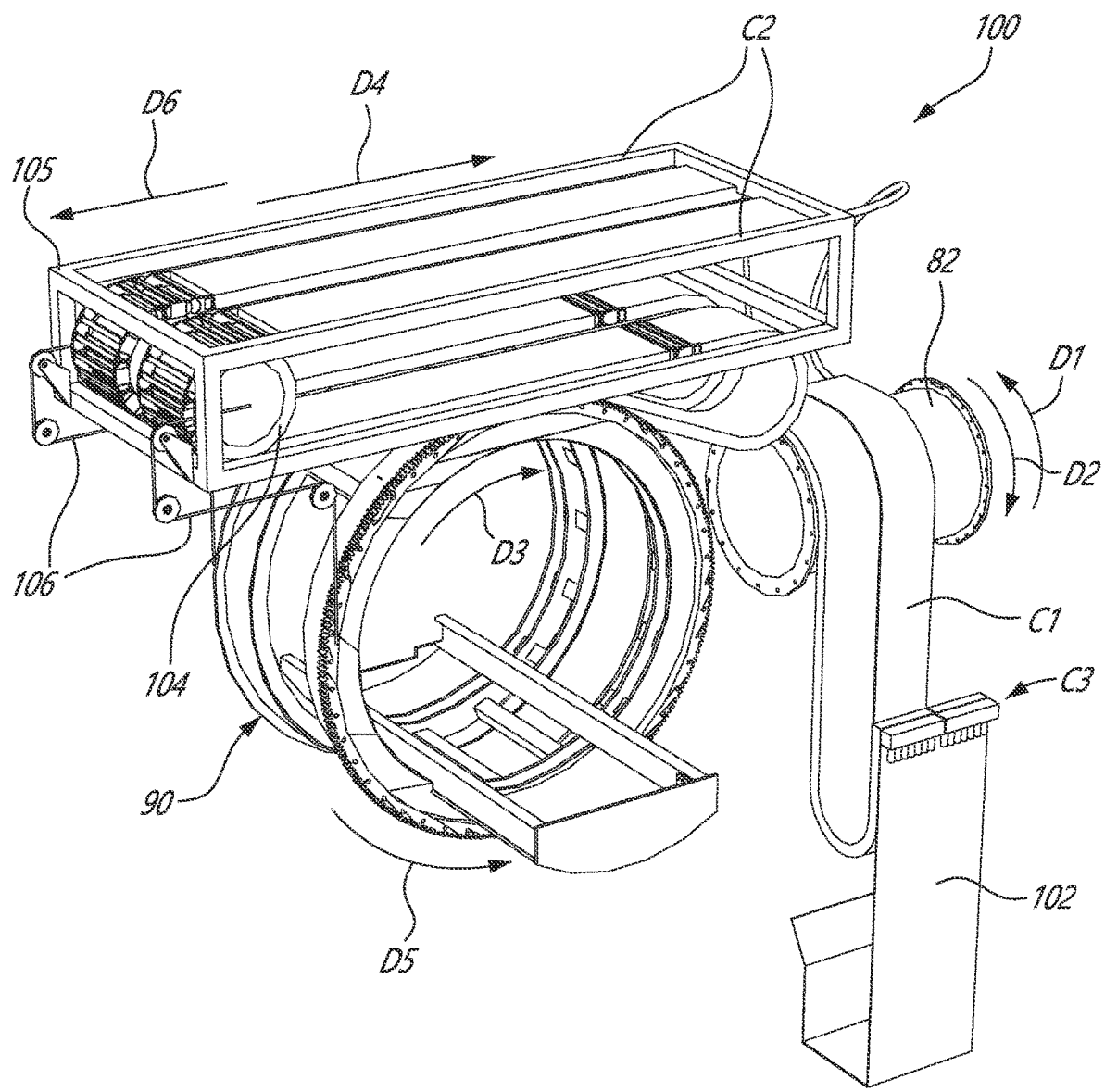

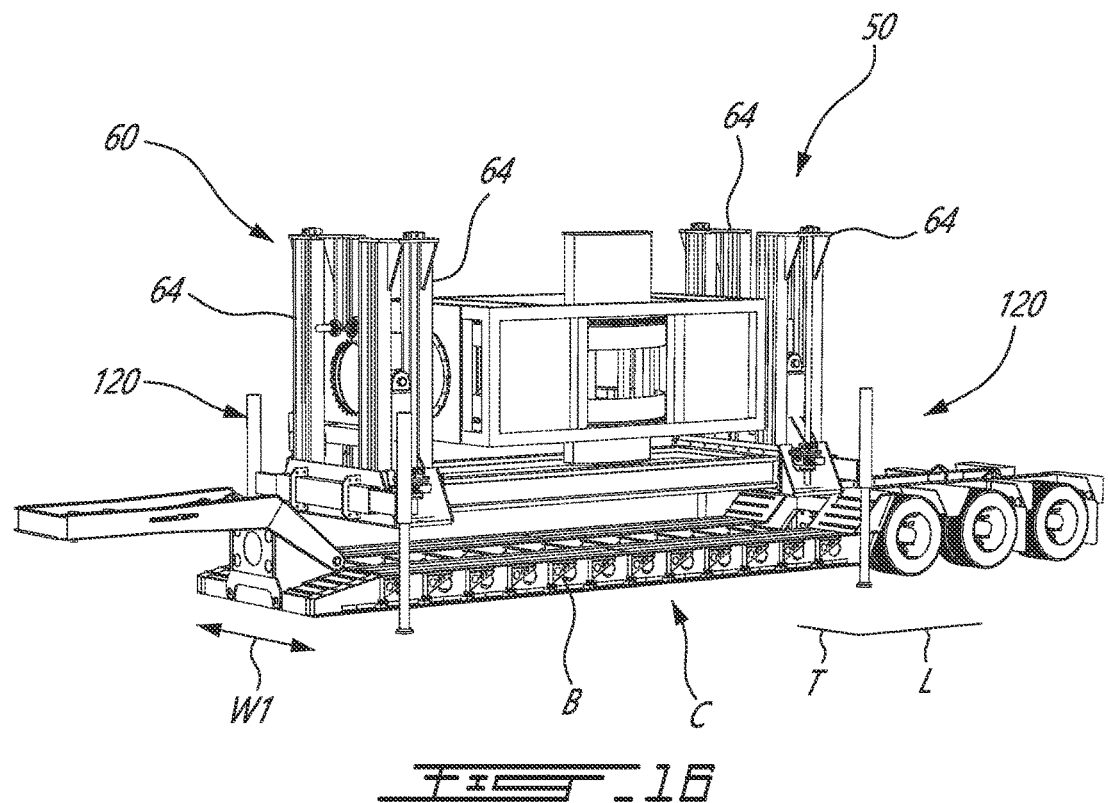
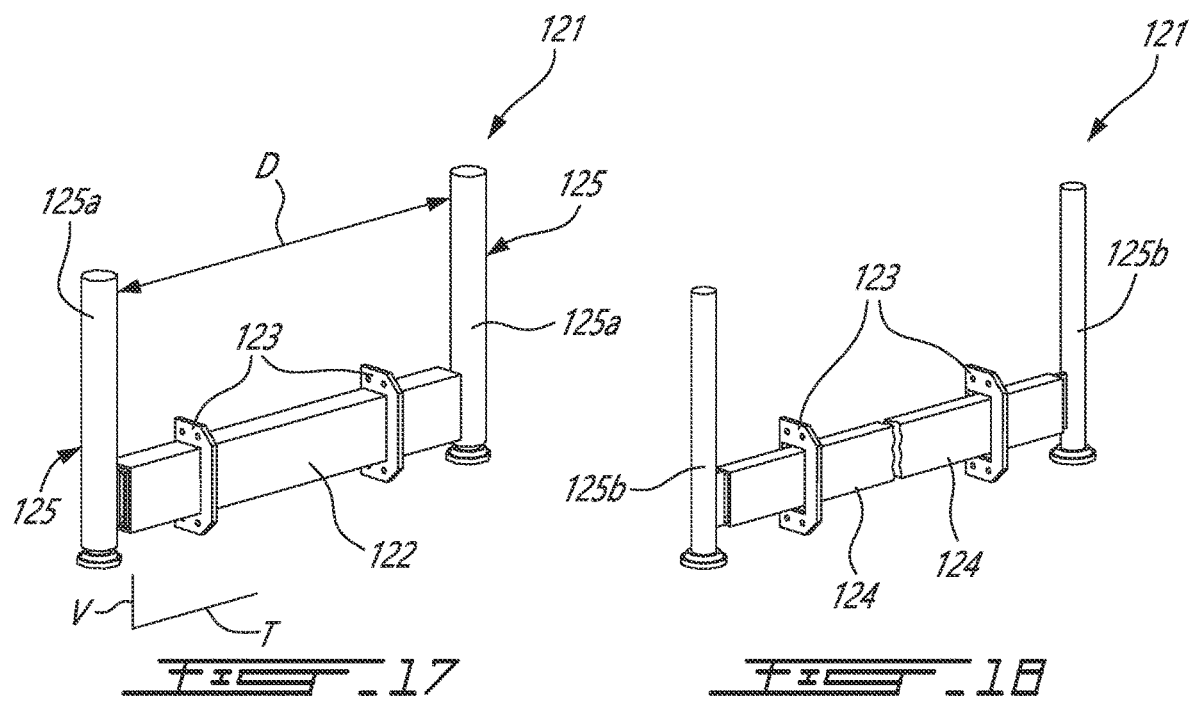

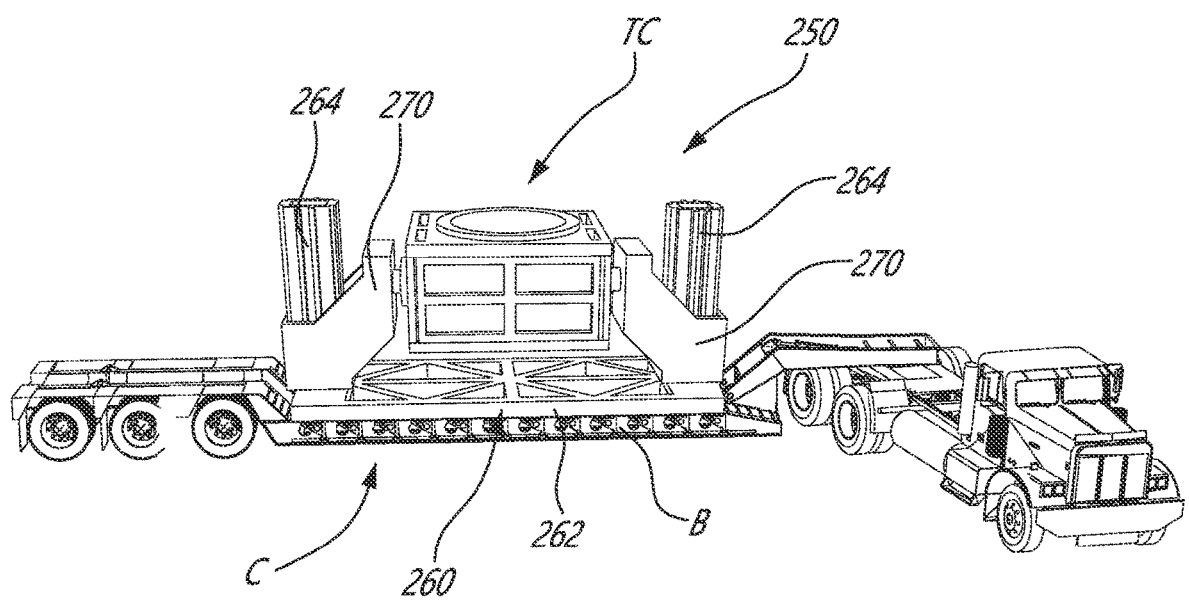

PORTABLE TEST STAND FOR AIRCRAFT ENGINES

TECHNICAL FIELD

The application relates generally to aircraft engines and, more particularly, to test stands for such engines.

BACKGROUND OF THE ART

Test stands are used in testing facilities for testing and verifying performance of newly designed or recently overhauled aircraft engines in various operating conditions. For instance, tests can be performed to measure thrust generated by the aircraft engine, to simulate impact with foreign objects or to evaluate the effect of aircraft flight attitudes on some of the engine fluid systems (e.g. lubricant, coolant, fuel).

For instance, aircraft engines have lubrication systems for lubricating different components, such as bearings, gears, and so on. In use, an aircraft equipped with one or more engine(s) experiences movements along pitch, roll, and yaw axes. These movements alter an angle of the engine(s) with respect to a ground and may affect how the lubricant and/or other fluids flow within the engine(s). Attitude tests are thus conducted to evaluate whether the lubrication system operates as designed for the "Attitude Operational Envelope" in which a particular engine/aircraft combination is expected to operate.

Typically, a test stand, whether it is used for attitude testing or else, is a massive installation permanently implanted at a given site of an engine testing facility resulting in a test stand that is immobile. Noise issues are a significant concern for on-going outdoor tests in the area surrounding the testing facility. Engines tested on such a permanent and immobile test stand may generate an important level of noise. Since noise is classified as a "contaminant" in many jurisdictions, generating such noise above a given level may be prohibited. These limitations may impede the attitude tests and, thus, impede the implantation of test stands in certain environments.

SUMMARY

In accordance with one aspect, there is provided a portable attitude test stand (PATS) for an aircraft engine, comprising: a support frame mountable on a trailer of a road vehicle; a test cell supported by the support frame and sized to receive the aircraft engine, the test cell operable to rotate the aircraft engine about a pitch axis and a roll axis of the aircraft engine; and an actuator operatively connected to the test cell and to the support frame, the actuator operable to lower and raise the test cell relative to the support frame between a transport configuration in which the test cell has a transport height and a test configuration in which the test cell has a test height, the test height being greater than the transport height.

In some embodiments, the support frame includes a base and vertical members protruding from the base, two carriages movably engaged to the vertical members of the support frame, the test cell supported by the support frame via the carriages, the carriages movable relative to the vertical members to vary the height of the test cell between the test height and the transport height.

In some embodiments, the actuator includes two actuators each engaged to a respective one of the two carriages and to the support frame.

In some embodiments, two shaft members are secured to the test cell, the two shaft members rollingly engaged to the two carriages, a step motor secured to one of the two carriages and in driving engagement with a corresponding one of the shaft members for rotating the test cell about the pitch axis of the aircraft engine.

In some embodiments, the actuator includes two actuators, each of the two actuators including a first motor secured to a respective one of the two carriages and a threaded member in driving engagement with the first motor, the threaded member threadingly engaged to a threaded rod secured to the base and extending vertically away from the base, rotation of the threaded members by the first motors inducing translation of the threaded members and the two carriages relative to the vertical members of the frame.

In some embodiments, the actuator includes two actuators, each of the two actuators including a first motor secured to the frame and a threaded rod in driving engagement with the first motor and extending vertically away from the base, the threaded rod threadingly engaged to a threaded member secured to a respective one of the two carriages, rotation of the threaded rods by the first motors inducing translation of the threaded members and of the two carriages relative to the vertical members of the frame.

In some embodiments, the test cell includes a pitch frame and a roll cage rotatably received within the pitch frame, the roll cage sized to receive the aircraft engine, two shaft members secured to the pitch frame and protruding away therefrom, each of the two shaft members rollingly engaged to a respective one of the two carriages.

In some embodiments, a first motor is secured to one of the two carriages and in driving engagement with one of the two shaft members for rotating the pitch frame about the pitch axis.

In some embodiments, a second motor is secured to the pitch frame and in driving engagement with the roll cage for rotating the roll cage about the roll axis.

In some embodiments, the test stand includes a pitch frame and a roll cage rotatably received within the pitch frame, the roll cage sized to receive the aircraft engine, the PATS including a cable management system having: a first annular wall secured to the roll cage and extending around the roll axis, a second annular wall secured to the pitch frame and extending around the first annular wall, and cables having first ends secured to the first annular wall and second ends secured to the second annular wall, the cables located between the first and second annular walls, lengths of the cables selected to allow rotation of the first annular wall relative to the second annular wall about the roll axis.

In some embodiments, outriggers are secured to the support frame and lifting actuators secured to distal ends of the outriggers, the outriggers movable relative to the support frame between a retracted configuration and an extended configuration, a distance between the lifting actuators in a direction transverse to a direction of travel of the trailer is greater in the extended configuration than in the retracted configuration, in the extended configuration the lifting actuators operable to engage a ground to lift the support frame off the trailer.

In some embodiments, the outriggers are pivotable relative to the support frame between the retracted configuration and the extended configuration.

In some embodiments, the lifting actuators includes two pairs of lifting actuators, distances in the direction transverse to the direction of travel between the lifting actuators of each pairs of lifting actuators is at most a width of the trailer when the outriggers are in the retracted configuration.

In some embodiments, dimensions of the support frame are selected to be contained within a footprint of a flatbed portion of the trailer.

In some embodiments, the transport height extends from a ground to a most elevated point on the test cell, the transport height less than 14 feet when the test cell is mounted on the trailer.

In some embodiments, the test height is such that a clearance remains between the aircraft engine and a ground for a pitch angle of the aircraft engine varying from 90 to −90 degrees, the pitch angle defined between a central axis of the aircraft engine and the ground.

In some embodiments, a base of the support frame is defined by the trailer.

In another aspect, there is provided a method of preparing an aircraft engine for an attitude test, comprising: transporting a trailer and a portable attitude test stand (PATS) mounted on the trailer from a first site to a second site, a test cell of the PATS having a transport height during the transporting; and at the second site, increasing a height of a test cell of the PATS from the transport height to a test height greater than the transport height, the test height selected to allow pitch movements of the aircraft engine.

In some embodiments, the increasing of the height includes unloading the PATS from the trailer before the increasing of the height.

In some embodiments, the increasing of the height includes moving the test cell of the PATS relative to a support frame of the PATS with an actuator engaged to the support frame and the test cell.

DESCRIPTION OF THE DRAWINGS

Reference is now made to the accompanying figures in which:

FIG. 5 is a three dimensional view of the portable attitude test stand of FIG. 4 in a testing configuration;

FIG. 6 is a three dimensional view of a support frame of the portable attitude test stand of FIG. 5;

FIG. 7 is a top view of vertical frame members of the support frame of FIG. 6;

FIG. 8 is a three dimensional view of one of two carriages of the portable attitude test stand of FIG. 5;

FIG. 9 is a front view of the carriage of FIG. 8;

FIG. 10 is a three dimensional exploded view of a test cell of the portable attitude test stand of FIG. 5;

FIG. 11 is a three dimensional view of a mounting structure shown with a turboshaft engine mounted thereto; the mounting structure mountable to the test cell of FIG. 10;

FIG. 12 is a three dimensional view of the portable attitude test stand of FIG. 5 with parts thereof hidden for better illustration of a cable management system;

FIG. 16 is a three dimensional view of the portable attitude test stand of FIG. 4 in an intermediate configuration lifted off the trailer;

FIG. 17 is a three dimensional view of a lifting system of the portable attitude test stand of FIG. 5;

FIG. 18 is a three dimensional view of the lifting system of FIG. 17 with parts hidden for illustration purposes;

FIG. 24 is a schematic three dimensional view of a portable attitude test stand in accordance with another embodiment.

DETAILED DESCRIPTION

Figure 1:
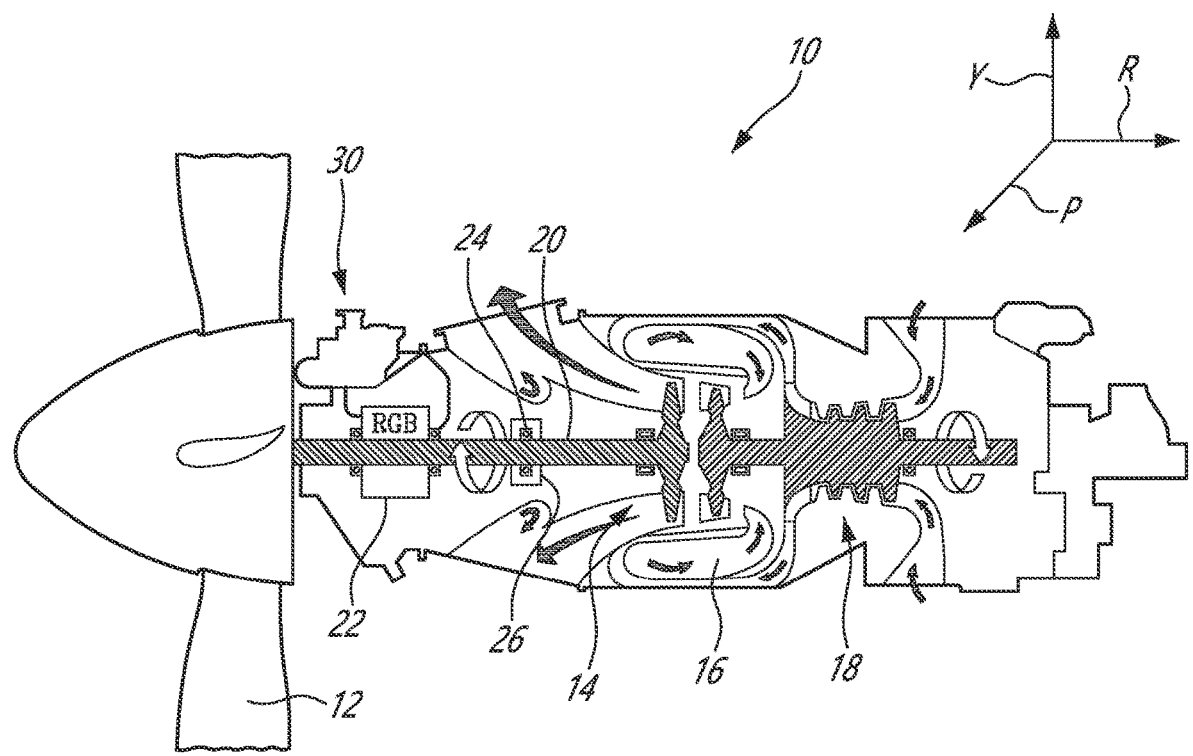
FIG. 1 is a schematic cross sectional view of a turboprop gas turbine engine.

FIG. 1 illustrates an aircraft engine, for instance, a gas turbine engine 10 of a type preferably provided for use in subsonic flight. The exemplified engine 10 is depicted in FIG. 1 as a turboprop having a propeller 12. The engine 10 has, in serial flow communication, a compressor section 14 for pressurizing the air, a combustor 16 in which the compressed air is mixed with fuel and ignited for generating an annular stream of hot combustion gases, and a turbine section 18 for extracting energy from the combustion gases. The engine 10 has a shaft 20 drivingly engaged to the propeller 12 via a reduction gear box 22. The shaft 20 is rotatably supported by bearings 24, which are contained within bearing housings 26.

Figure 2:
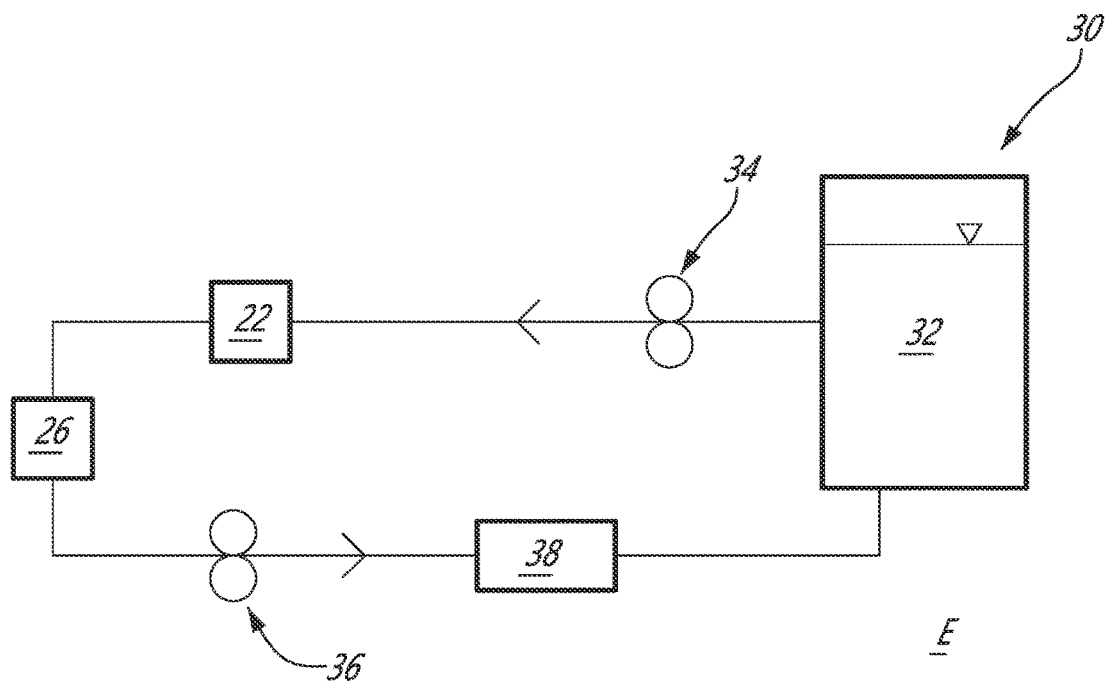
FIG. 2 is a schematic view of a lubrication system of the engine of FIG. 1.

Referring to FIG. 2, the engine 10 has a lubrication system 30 for providing lubricant to the bearings 24 and the reduction gear box 22. The system 30 includes a tank 32 containing lubricant, a pump 34 hydraulically connected to the tank 32 and to the components in need of lubrication, which corresponds in the embodiment shown to the bearing housing(s) 26 and the reduction gearbox 22, a scavenge pump 36 hydraulically connected to scavenge outlets of the components and used to flow scavenged lubricant back to the tank 32, and a de-aerator 38 hydraulically connected to the scavenge outlets of the components and operable to extract lubricant from an air-lubricant mixture exiting the components via their scavenge outlets. The de-aerator 38 has an outlet hydraulically connected to the tank 32. It will be appreciated that the lubrication system 30 may include other components, such as filters, not shown in FIG. 2. The engine 10 may be equipped with any suitable lubrication system.

In use, the gas turbine engine 10 mounted to an aircraft is subjected to a plurality of movements about pitch, roll, and yaw axes P, R, Y. The lubrication system 30 is operable to inject the lubricant into the reduction gearbox 22 and the bearing housing(s) 26 and the lubricant flows by gravity within these components. Therefore, when the aircraft performs climb, descent, and roll manoeuvers, the flow of lubricant within these components may be affected.

Attitude tests are used to determine whether engine fluid systems, such as the engine lubrication system 30, operate as designed for the "Attitude Operational Envelope" in which the aircraft and engine 10 are expected to operate. Current computational fluid dynamics tools may not properly simulate mixed flow (air/lubricant) and may be unable to predict where oil will flow in turboprop and/or turboshaft reduction gearboxes and accessory gearboxes. Attitude tests are carried out by physically rotating the running engine 10 around the pitch axis P and the roll axis R to simulate aircraft maneuvering. It is used to evaluate the effects of the aircraft flight attitudes on engine fluid systems, such as fuel, coolant and lubrication systems.

Known attitude test stands are typically permanent installations implanted at a given site of an engine testing facility resulting in test stands that are immobile and difficult to adapt to changing environmental requirements. Noise issues are a significant concern for on-going outdoor tests in the area surrounding the testing facilities. Engines tested on these test stands generate an important level of noise. Since noise is classified as a "contaminant" in many jurisdictions, generating such noise above a given level may be prohibited. These limitations may impede the attitude tests and, thus, impede the implantation of test stands in certain environment.

Figure 3:
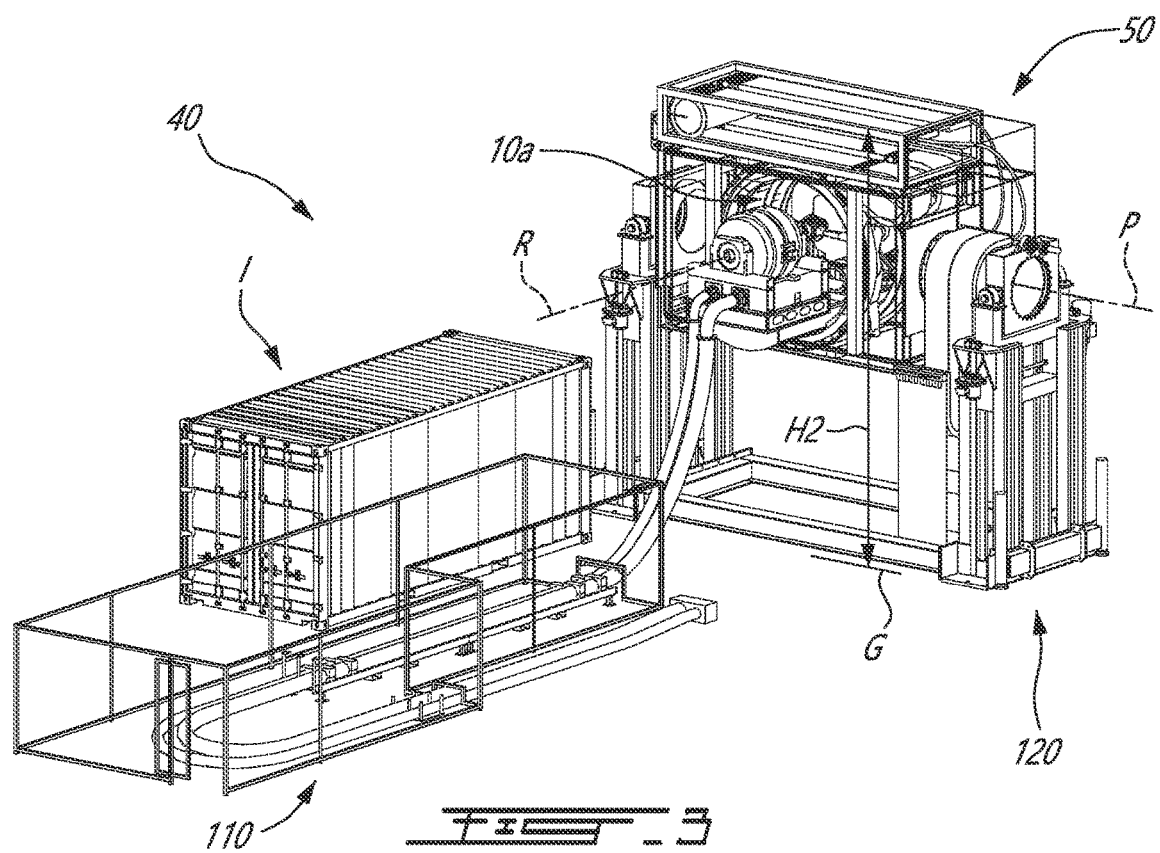
FIG. 3 is a three dimensional view of a portable attitude test stand system in accordance with one embodiment.
Figure 4:
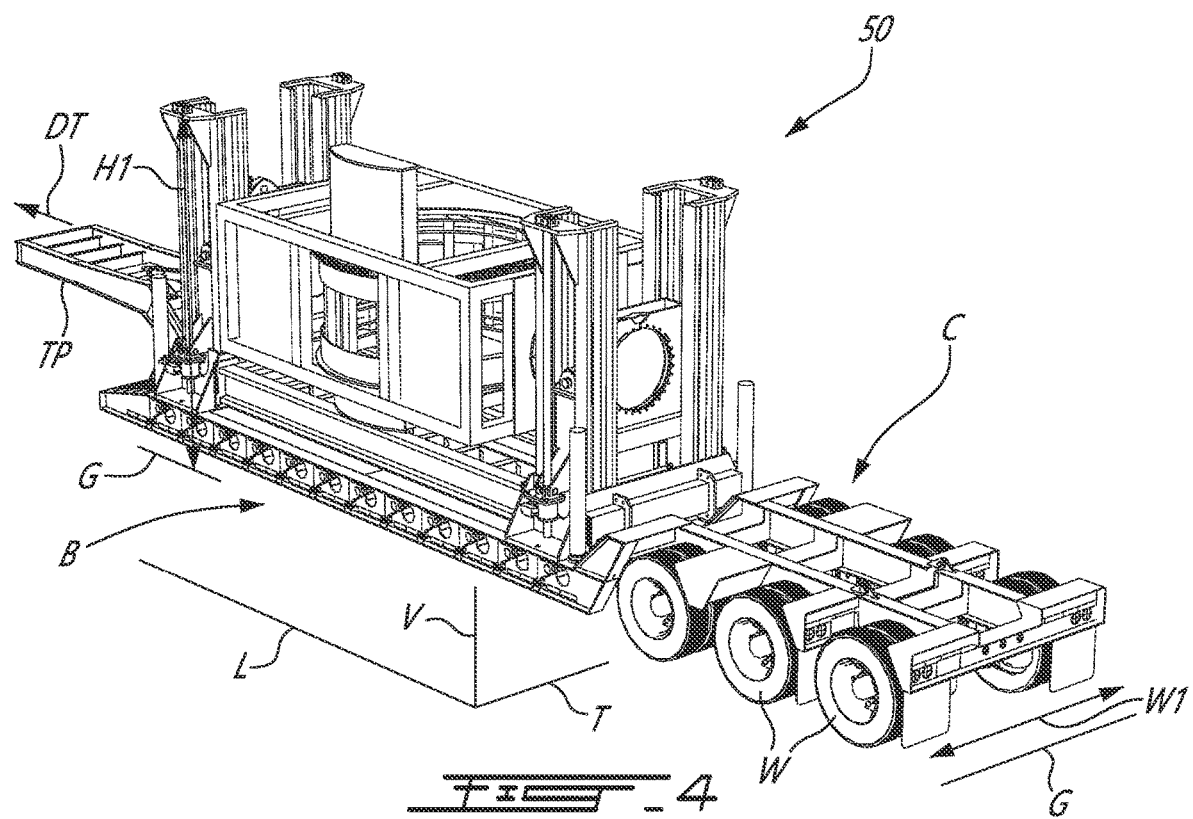
FIG. 4 is a three dimensional view of a portable attitude test stand of the system of FIG. 3 in a transport configuration mounted on a trailer for transportation between different geographical sites.

Referring now to FIGS. 3-4, a portable attitude test stand (PATS) system is shown at 40. In the context of the present disclosure, "portable", means movable or transportable between different geographical locations, for instance, between different cities, regions, countries, and so on. As will be discussed below and in accordance with at least some embodiments, the system 40 is suitable for road transportation.

The PATS system 40 is a transportable attitude test stand transportable to any suitable geographical sites via public roads (e.g. highways) via standard flatbed transports. The PATS system 40 includes a portable attitude test stand (PATS) 50 sized to receive an engine to be tested and operable to move the engine about the pitch and roll axes P, R to simulate movements of the engine in flight. The PATS 50 is sized to be received on a trailer C. Said trailer C may then be hauled by a road vehicle (e.g., truck) for moving the PATS 50 between different geographical sites.

The illustrated embodiment of the PATS system 40 further includes an instrumentation container I used for containing instrumentations operatively connected to the engine to be tested, a water management system 110 for flowing water to and from the PATS 50, and a lifting system 120 for lifting the PATS 50 off the trailer C. The instrumentation container I is separate from the PATS 50 and may be received on another trailer and hauled by another truck to the desired site for testing. The instrumentations container I is operatively connected to the tested engine for measuring data about the flow of lubricant within said engine. The PATS 50 is exemplified in FIG. 3 with a turboshaft engine 10a received in the PATS 50, but may alternatively receive the turboprop engine 10 of FIG. 1, a turbofan engine or any other types of aircraft engines.

The PATS 50 is shown in a test, or deployed, configuration in FIG. 3 and in a transport, or collapsed, configuration in FIG. 4. The PATS 50 is shown in an intermediate configuration in FIG. 16. The PATS 50, in the transport configuration, is sized to be transportable by the trailer C. The trailer C may, for instance, be a lowboy trailer. The trailer C has wheels W at a rear end thereof and a traction pin TP at a front end thereof adapted to be attached to a motive vehicle, such as a truck (not shown). The trailer C has a flatbed portion B. The PATS 50 is sized to have a footprint matching the size of the flatbed portion B of the trailer C.

The PATS 50 has a transport height H1 in the transport configuration of FIG. 4 and a test height H2 in the test configuration of FIG. 3. The transport and test heights H1, H2 are measured from a ground G to a most elevated point of the PATS 50. The test height H2 is greater than the transport height H1. The transport height H1 is typically at most 14 feet, and preferably at most 13.6 feet. The transport height H1 is measured when the PATS 50 is on the trailer C. Such a height constraint in the transport configuration is selected to allow the PATS 50 mounted on the trailer C to pass under overpasses when moving between the different geographical sites. As will be discussed below, the test height is selected to provide sufficient clearance between the engine being tested and the ground G when moving the engine about the pivot axis P (FIG. 1)

In the embodiment shown, the PATS 50 is sized to accommodate gas turbine engines generating a maximum thrust of 20000 lbs or less. The size of an attitude test stand able to accommodate gas turbine engines generating a maximum thrust of more than 20000 lbs of thrust may be too big for road transportation. In other words, the dimensions of the attitude test stand able to accommodate engines of 20000 lbs or more of thrust may be too big to circulate on public roads and under overpasses when moving between the different geographical sites.

By being transportable, the PATS 50 allows the testing of engines in any suitable locations, away from municipalities where regulations prevent or limit noise emissions. Testing sites usually start billing as soon as testing facilities are on sites. Therefore, rapidity in deploying the PATS 50 from its transport configuration to its testing configuration is a key to minimize costs involved in the testing. Many components of the PATS 50 aim to facilitate the deployment and the storage of the PATS 50 and are described herein below.

Referring to FIG. 5, the PATS 50 includes a support frame 60, right and left carriages 70, 70', actuators 71 connected to the support frame 60 and to the carriages 70, 70' and operable to lower and raise the test cell TC relative to the support frame 60, a pitch frame 80 supported by the support frame 60, a roll cage 90 rotatably received within the pitch frame 80, and a cable management system 100. As will be described below, the right and left carriages 70, 70' support the pitch frame 80 and are movable relative to the support frame 60 in a vertical direction to elevate the pitch frame 80 from the ground G thanks to the actuators 71. The support frame 60, in the embodiment shown, is able to lift itself from the trailer C such that testing is carried out with the support frame 60 laying on the ground G and not on the trailer C.

The PATS 50 is shown in the test configuration in FIG. 5 and in the transport configuration in FIG. 4. As will be discussed below, the PATS 50 is able to move itself from the transport configuration to the test configuration and vice versa. The actuators 71 are connected to the carriages 70, 70' and to the support frame 60 to move the pitch frame 80 and the roll cage 90 relative to the support frame 60 between the transport and test configurations. A height H of the engine 10, 10a to be tested is greater in the test configuration than in the transport configuration. The height H of the engine 10, 10a is increased to avoid an exhaust of the engine 10, 10a from being too close to the ground G for safety purposes. Also, the height H of the engine 10, 10a is increased to allow for sufficient amplitude of movements of the engine 10, 10a about the pitch axis P. More specifically, the test height H2 is such that the height H of the gas turbine engine 10, 10a is sufficient to allow a pitch angle of the gas turbine engine 10, 10 to vary by 90 to −90 degrees. The pitch angle is defined between the central axis of the gas turbine engine 10, 10a and the ground G. If the engine 10, 10a were not elevated sufficiently from the ground G, the engine 10, 10a may become in contact with the ground G at certain pitch angles. The PATS 50 allows for decreasing the height H of the pitch frame 80 and the roll cage 90 in the transport configuration such that the trailer C having the PATS 50 mounted thereto is below a height threshold allowing it to roll on public roads and to pass underneath overpasses. As aforementioned, this height threshold is 14 feet, in some cases 13.6 feet. Decreasing the height may also decrease a drag force exerted on the PATS 50 by ambient air when the PATS 50 is transported from one site to another.

Referring now to FIG. 6, the support frame 60 is the base of the PATS 50 as it supports the weight of the pitch frame 80, the roll cage 90, and the engine 10, 10a secured within the roll cage 90. The frame 60 includes a base 62 including two longitudinal frame members 62a extending along a longitudinal axis L, which corresponds to a direction of travel DT (FIG. 4) of the trailer C (FIG. 4) and two transversal frame members 62b extending along a transversal axis L being transverse to the longitudinal axis L and transverse to the direction of travel DT. In the illustrated embodiment, each of the two transversal frame members 62b extends from one of the two longitudinal frame members 62a to the other. The support frame 60 includes four vertical frame members 64 extending along a vertical axis V normal to both of the longitudinal and transverse axes L, T and from corners of the base 62.

In the embodiment shown, a width W2 of the support frame 60 in a direction transverse to the direction of travel DT of the trailer C (FIG. 4) is at most a width W1 (FIG. 4) of the trailer C. In some embodiments, the width W1 of the trailer C is 108 inches. Having the width W2 of the support frame 60 being at most that of the trailer C may contribute in facilitating transportation of the PATS 50 since the support frame 60 does not protrude beyond the trailer C.

Referring to FIG. 7, a top view of a portion of the support frame 60 shows that the vertical frame members 64 defines cavities 64a sized to slidably receive a respective one of the left and right carriages 70, 70'. Each vertical frame members 64 defines a groove, or track 64b for receiving portions of the carriages 70, 70' and for guiding movements of the carriages. As shown in FIG. 6, the support frame 60 further includes four threaded rods 66 each extending along the vertical axis V and being secured to a respective one of the four vertical frame members 64.

Referring to FIGS. 8-9, the support frame 60 slidably supports the pitch frame 80 and the roll cage 90 via the two carriages 70, 70', one being shown in FIGS. 10-11. The carriage 70 includes a main frame 72 and a pitch frame supporting member 74 pivotably mounted to the main frame 72 for rotation about pivot axis P1. The carriage 70 includes a plurality of bearings 76 (eight in the illustrated example), four on each opposite sides of the carriage 70. Any suitable types of bearings can be used. For instance, it is contemplated to use combination bearings. The two carriages 70, 70' are slidably received within the cavities 64a (FIG. 7) defined between the vertical frame members 64 of the support frame 60. The bearings 76 are received within the grooves, or tracks, 64b of the vertical frame members 64 to provide a sliding engagement between the main frames 72 and the vertical frame members 64 of the support frame 64 to allow the carriages 70, 70' to move up and down along the vertical axis V.

As shown more clearly on FIG. 9, the two actuators 71 of the two carriages 70, 70' are ball screw actuators. Each of the two actuators 71 includes a motor 78 (e.g., an electric motor), two gearboxes 77, two threaded members 77a, a shaft 79, and two threaded rods 66 (FIG. 6).

The motors 78 and gearboxes 77 are secured to the main frames 72. Each of the motors 78 is in driving engagement with two of the gearboxes 77. In the embodiment shown, the two gearboxes 77 of each of the carriages 70, 70' are drivingly engaged to one another via the shaft 79. Each of the two gearboxes 77 is disposed on a respective one of opposite sides of the main frame 72 and secured thereto. Each of the gearboxes 77 is in driving engagement with a threaded member 77a. Each of the threaded members 77a is threadingly engaged to a respective one of the four threaded rods 66. In use, operation of the motors 78 creates rotational inputs transmitted to the four threaded members 77a via the four gearboxes 77 and shafts 79. As the threaded members 77a rotate about the threaded rods 66, the carriages 70 move up and down along the vertical axis V.

It is contemplated that that each of the four gearboxes 77 may be coupled to a respective one of four motors 78. It will be appreciated that any suitable actuators operable to move the carriages 70 relative to the vertical frame members 64 of the support frame 60, such as hydraulic actuators connected to the carriages 70, 70' and the support frame 60, may be used without departing from the scope of the present disclosure. Any suitable number of actuator(s) may be used to lift the pitch frame 80 and roll cage 90 relative to the support frame 60. In some cases, only one actuator may be used. Actuators should in the present disclosure be construed as any system operable to change a height of the test cell TC relative to the ground G.

Still referring to FIGS. 8-9, each of the two pitch frame supporting members 74 is pivotably secured to a respective one of the two main frames 72 via two shaft portions 74a rotatably received within two bearings 73. The two bearings 73 are secured to the main frames 72. Pivotal movements of the pitch frame supporting members 74 relative to the main frames 72 about the pivot axes P1 may cater to flexion of shaft members 82, 83 that secure the pitch frame 80 to the carriers 70, 70'. Such a flexion may occur because of the weight of the engine 10, 10a and/or because of a misalignment between the two carriages 70, 70' when raising or lowering the test cell.

Referring to FIG. 8, one of the two carriages 70 is able to induce rotation of the pitch frame 80 to rotate the engine 10, 10a about the pitch axis P (FIG. 1). To this end, the carriage 70 has a step motor 75 drivingly engaged to a first gear 74c. The first gear 74c is meshed with a second gear 74d. As will be explained herein below, the second gear 74d is secured to the pitch frame 80 such that the step motor 75 transmits a rotational input to the second gear 74d to rotate the pitch frame 80 about the pitch axis P of the engine. In the present embodiment, the first and second gears 74c, 74d are received within a gear housing 74e. The gear housing 74e is secured within the pitch frame supporting member 74. As shown in FIG. 9, the pitch frame supporting member 74 defines an aperture 74f sized to receive either one of the shaft members 82, 83.

It will be appreciated that, in the present embodiment, only one of the two carriages 70, 70' is equipped with a step motor 75. Alternatively, each of the two carriages 70, 70' may be equipped with a step motor 75. The carriage 70 equipped with the step motor 75 is referred as the motorized carriage 70.

Referring now to FIG. 10, a test cell TC of the PATS 50 is shown in an exploded view and includes the pitch frame 80 and the roll cage 90. The roll cage 90 is rotatably received within the pitch frame 80 and is rotatable relative to the pitch frame 80 about the roll axis R (FIG. 1) of the engine 10, 10a. An extension 94 is secured to the roll cage 90 when a dynamo 48 (FIG. 11) is required, for instance, when the engine tested is the turboshaft engine 10a. More detail about the dynamo 48 are presented below.

The pitch frame 80 includes a main frame 81, a first shaft member 82 and a second shaft member 83. The first and second shaft members 82, 83 are secured to and extend from the main frame 81 in a direction away from one another. As shown in FIG. 10, the shaft members 82, 83 are coaxial. Each of the first and second shaft members 82, 83 is rotatably secured within a respective one of the apertures 74f (FIG. 9) of the pitch frame supporting members 74 of the carriages 70, 70'. In the embodiment shown, the first shaft member 82 is secured to the second gear 74d of the motorized carrier 70. It will be appreciated that bearings are provided between the carriages 70 and the first and second shaft members 82, 83 to assist rotation of the pitch frame 80 relative to the carriages 70.

The roll cage 90 is rotatably received within an opening 84 of the pitch frame 80. The roll cage 90 includes two annular members 90a secured to one another by ribs 90b. The roll cage 90 has a gear 92 secured to one of the two annular members 90a. The gear 92 of the roll cage 90 is engageable by another gear drivingly engaged by a motor 85 (FIG. 20) secured to the pitch frame 80. Actuation of the motor 85 induces rotation of the roll cage 90 about a rotation axis A and relative to the pitch frame 80 to rotate the gas turbine engine 10, 10a about the roll axis R (FIG. 1). It will be appreciated that any other suitable means used to rotate the roll cage 90 relative to the pitch frame 80 are contemplated without departing from the scope of the present disclosure.

Still referring to FIG. 10, the main frame 81 of the pitch frame 80 includes longitudinal, longitudinal, transversal, and vertical members 81a, 81b, 81c. A number and disposition of which may be varied from what is being illustrated in FIG. 10. The main frame 81 includes two floor sections 81d secured to the longitudinal and transversal members 81, 81b to support a user working on the gas turbine engine 10, 10a for setting up said engine in preparation of the attitude test.

The extension 94 includes two rails 94a and a web 94 secured to the two rails 94a. As will be described below, the extension 94 is used as an interface between the gas turbine engine to be tested and the roll cage 90. The extension 94 may be omitted if the engine tested is a turbofan or a turboprop. The extension 94 is securable to the ribs 90b and/or the annular members 90a of the roll cage 90.

Referring now to FIG. 11, the dynamo 48 is drivingly engaged to an output shaft of the turboshaft 10a to simulate a rotatable load. In other words, the dynamo 48 exerts a rotational resistance on the turboshaft engine 10a. The dynamo 48 is hydraulically connected to a water source S (FIG. 13) as will be explained herein below. The dynamo 48 uses water to create the rotational resistance to the turboshaft engine 10a. It will be appreciated that if the engine tested in the PATS 50 is the gas turbine engine 10 of FIG. 1, which is a turboprop engine, the propeller 12 is drivingly engaged to the shaft 20 of the engine 10 and no dynamo is required since the propeller 12 will generate the rotatable load. A turbofan may also be tested using the PATS 50 and the fan acts as the rotatable load.

In the embodiment shown, the gas turbine engine 10a and the dynamo 48 are supported on a mounting structure 96. The mounting structure 96 has two transversal members 96a longitudinally spaced apart from one another and secured to one another by longitudinal members 96b. Combination bearings 96c are secured to the transversal members 96a. According to the illustrated embodiment, two combination bearings 96c are secured on each of the two transversal members 96a. The combination bearings 96c are rollingly engageable to the two rails 94a (FIG. 10) of the extension 94 (FIG. 10) to allow the mounting structure 96 and the engine 10a secured thereto to move relative to the roll cage 80. This movement may be used to allow the user to setup different connections to the engine 10a for testing purposes. Any suitable means of fastening the engine 10a to the roll cage 90 are contemplated without departing from the scope of the present disclosure.

Referring now to FIG. 12, during the attitude test, the engine 10, 10a mounted on the PATS 50 is hooked up to the instrumentation container 42 via cables C1, C2. However, the engine 10, 10a is moving along its pitch and roll axes P, R (FIG. 1) and the connections between the engines 10, 10a and the instrumentation container 42 has to be maintained during the attitude test. To this end, the PATS 50 is equipped with a cable management system 100 that allows the cables C1, C2 to follow movements of the engine 10, 10a. Some elements of the PATS 50 have been removed for illustration purposes to better illustrate the cable management system 100.

In the embodiment shown, the cables C1, C2 include a first set of cables C1 used to follow pitch movements of the engine 10, 10a and a second set of cables C2 used to follow roll movements of the engine 10, 10a.

The first set of cables C1 is partially wrapped around the first shaft member 82, which is secured to the pitch frame 80. A length of the cables of the first set C1 is selected to allow rotation of the pitch frame 80 along a direction denoted by arrow D1 without having the cables C pulling on their connectors C3. More specifically, the cables of the first set C1 extends from the first shaft member 82 downwardly up to a location below the connectors C3 and extend therefrom upwardly to the connectors C3. This excess in length is such that rotation of the first shaft member 82, and thus pitching of the engine 10, 10a, will pull on the cables of the first set C1 up to a point where there is no more excess length and without pulling on the connectors C3.

Similarly, rotating the pitch frame 80 along a direction denoted by arrow D2 and opposite the direction D1 will increase the excess length of the cables of the first set C1. To avoid the cables of the first set C1 from rubbing against the ground G, a cable support 102 is provided and secured to the support frame 60 (FIG. 6) of the PATS 50. The cable support 102 receives the cables of the first set C1 when the pitch frame 80 is rotated along the direction D2 opposite the direction D1.

Still referring to FIG. 12, the cables of the second set C2 are connected at one extremity to the cables of the first C1 and are secured to the roll cage 90 at their opposite extremities. The cables of the second set C2 are partially wrapped around a roll 104, which is movably received within a cable cage 105 secured on top of the pitch frame 80. Ropes 106 are secured at one of their ends to the roll 104 and at their opposite ends to the roll cage 90. In such a case, rotation of the roll cage 90 along direction D3 will pull on the cables of the second set C2 and causes the roll 104 to slide along direction D4 thereby increasing an effective length of the cables of the second set C2. Similarly, rotation of the roll cage 90 along direction D5 opposite direction D3 will cause the roll cage 90 to pull on the ropes 106 thereby pulling on the roll 104 to move said roll 104 in a direction D6 opposite the direction D4. The cable management system 100 may, thus, allow the cables C1, C2 to follow any movements of the engine 10, 10a about the pitch and roll axes P, R (FIG. 1).

Figure 13:
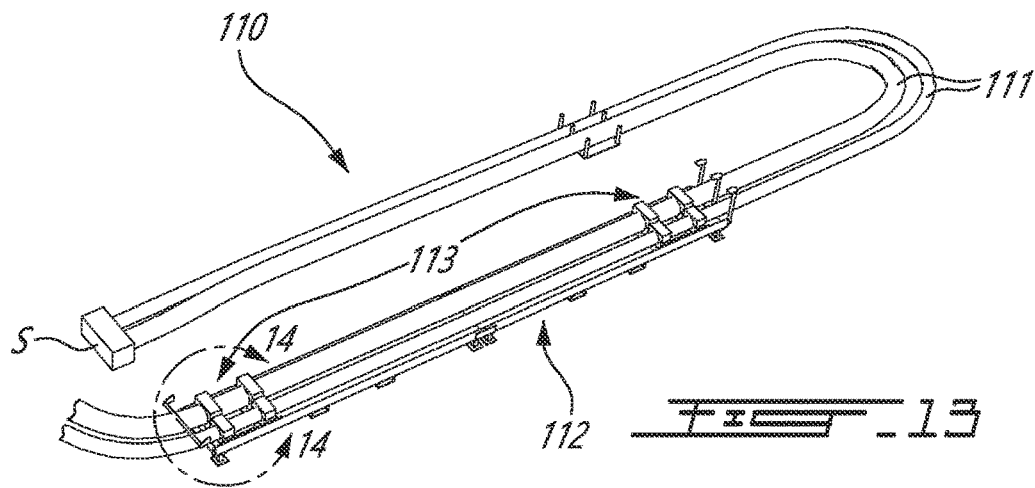
FIG. 13 is a three dimensional view of a water management system of the portable attitude test stand system of FIG. 3.
Figure 14:
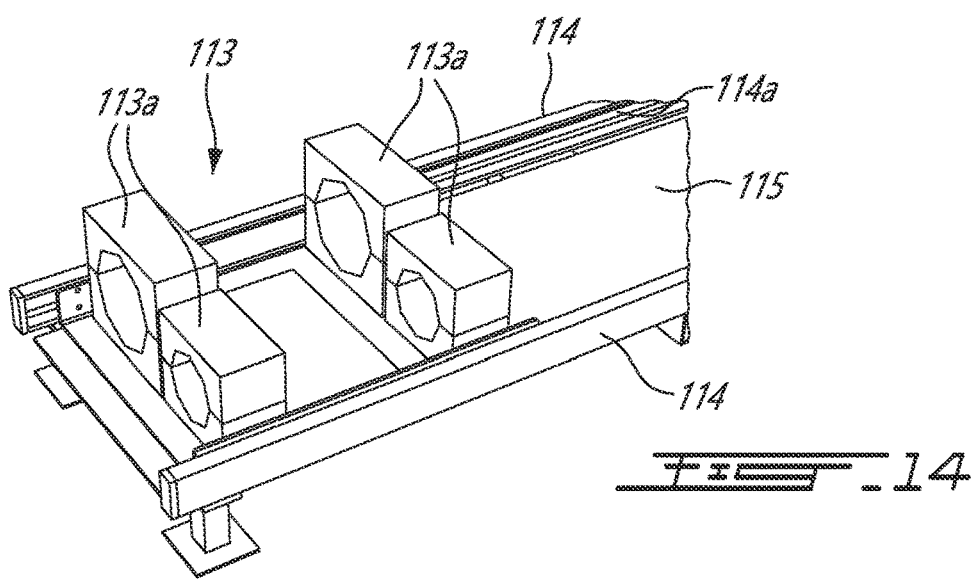
FIG. 14 is an enlarged view of zone 14-14 of FIG. 13.
Figure 15:
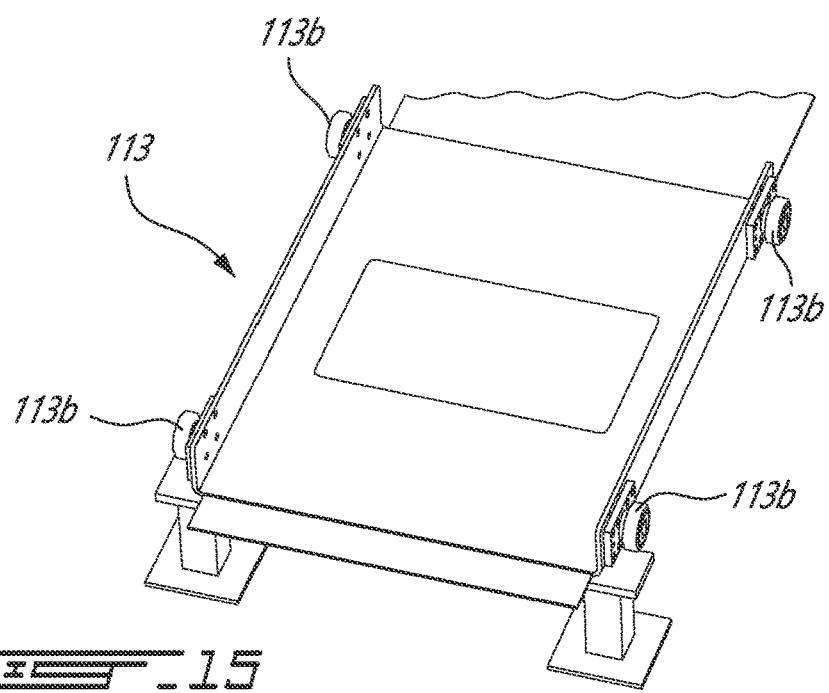
FIG. 15 is another enlarged view of the zone 14-14 of FIG. 13 with parts hidden for illustration purposes.

Referring now to FIGS. 13 to 15, the water management system 110 is described in more detail. The water management system 110 includes water lines 111. The water lines 111 are removed from FIGS. 14 and 15 for illustration purposes. The water lines 11 hydraulically connect the dynamo 48 (FIG. 11) to the water source S. The dynamo 48 uses water to provide rotational resistance to the turboshaft engine 10a. In use, the water within the dynamo 48 becomes hot and may require cooling. The water lines 111 are used to bring water to the dynamo 48 and to drain heated water from the dynamo 48.

During testing, the turboshaft engine 10a moves with the pitch frame 80 and roll cage 90. To allow the water lines 111 to follow movements of the dynamo 48 and of the turboshaft 10a, the water management system 110 uses a railing system 112 to ease movements of the water lines 112.

Referring more particularly to FIG. 14, the railing system 112 includes two bogies 113 slidably mounted on rails 114, which are secured to the ground. A bottom panel 115 is disposed between the rails 114 to prevent the water lines 111 from rubbing against the ground. When the gas turbine engine 10a moves it may push or pull on the water lines 111. To cater to those movements, the bogies 113 slide along the rails 114 to follow the movements of the engine 10a. The bogies 113 include bracket 113a for securing the water lines 111 on the bogies 113.

Referring more particularly to FIG. 15, the rails 114 and brackets 113a are removed for illustration purposes. The bogies 113 each includes four bearings 113b, namely, two bearings on each sides. The bearings 113b are slidingly received within grooves 114a of the rails 114.

Referring now to FIGS. 16-18, the lifting system 120 of the PATS 50 has a retracted configuration (shown in FIGS. 4 and 17) and an extended configuration shown in FIG. 16. The lifting system 120 is operable to lift the PATS 50 off the trailer C as illustrated in FIG. 16. Once the PATS 50 is elevated from the trailer C, the trailer C may be moved relative to the PATS 50 to remove the trailer C from underneath of the PATS 50. Once the trailer C is removed, the lifting system 120 lowers the PATS 50 until the base 62 (FIG. 6) of the support frame 60 (FIG. 6) is laid on the ground G. The lifting system 120 may be stowed back in the retracted configuration during the attitude test, or may remain in the extended configuration for added stability.

Referring more particularly to FIGS. 17-18, the lifting system 120 includes two outriggers 121, namely a front outrigger and a rear outrigger longitudinally offset from the front outrigger about the longitudinal axis L. According to the illustrated embodiment, the front and the rear outriggers 121 are identical to one another.

The outriggers 121 are secured to the support frame 60. In the embodiment shown, each of the outriggers 121 is secured to two of the vertical frame members 64. One of the two outriggers 121 is shown in FIG. 17. FIG. 18 shows the outrigger of FIG. 17 with some parts removed for illustration purposes.

The outrigger 121 includes a housing 122 secured to the support frame 60 via two transversally spaced apart brackets 123. The housing 122 slidably receives two slidable members 124. Each of the two slidable members 124 is secured to a respective one of two actuators 125. In the depicted embodiment, the actuators 125 are hydraulic actuators but any suitable actuators may be used. As known, the two actuators 125 include first sections 125a secured to the slidable members 124 and second sections 125b slidably received within the first sections 125a. Lengths of the actuators 125 along the vertical axis V are variable by sliding the first sections 125a relative to the second sections 125b. In other words, the actuators 125 are extensible in a vertical direction relative to the vertical axis V to elevate the support frame 60 off the ground. In the present case, the actuators 125 are hydraulic actuators.

The outrigger 121 is shown in FIG. 17 in the retracted configuration suitable for transportation of the PATS 50. When it is required to lift the support frame 60 off the ground, the two sliding members 124 are moved away from one another within the housing 122 and along the transversal axis T such that the two actuators 125 of each of the two outriggers 121 extend away from one another along the transversal axis T. Any suitable means may be used to move the two sliding members 124 relative to the housing 122 of the outriggers 121. For instance, a rack and pinion gear arrangement may be used with a motor drivingly engaged to the pinion gear.

The outriggers 121, in the retracted configuration depicted in FIG. 17, have a transversal distance D between the two actuators 125 that is smaller than that in the extended configuration depicted in FIG. 16. Moreover, the transversal distance D in the extended configuration of FIG. 16 is greater than a width W1 (FIG. 16) of the trailer C along the transversal axis T to allow the actuators 125 to be operated without being impeded by the trailer C. Moreover, in the retracted configuration, the transversal distance D between the actuators 125 is such that the actuators 125 do not protrude beyond the flatbed portion B of the trailer C for ease of transportation. This can be appreciated by looking at FIG. 4 that shows that the four actuators 125 are contained within the width W1 of the trailer C. In other words, in the transport configuration, the PATS 50 is contained within a footprint of the flatbed portion B of the trailer C. This may ensure that a width of the PATS 50 does not protrude beyond the width W1 of the trailer C for ease of transportation on public roads.

The outriggers 121 are moved from their retracted configuration illustrated in FIG. 4 to their extended configuration shown in FIG. 16 when it is required to remove the PATS 50 from the trailer C. The actuators 125 are actuated to lift the support frame 60 off the bed portion B of the trailer C until the support frame 60 is sufficiently high to clear the trailer C. At which point, the trailer C is rolled away from underneath the support frame 60 and the actuators 125 may be operated to decrease the height of the support frame 60 until the support frame 60 is laid on the ground G.

Figure 19:
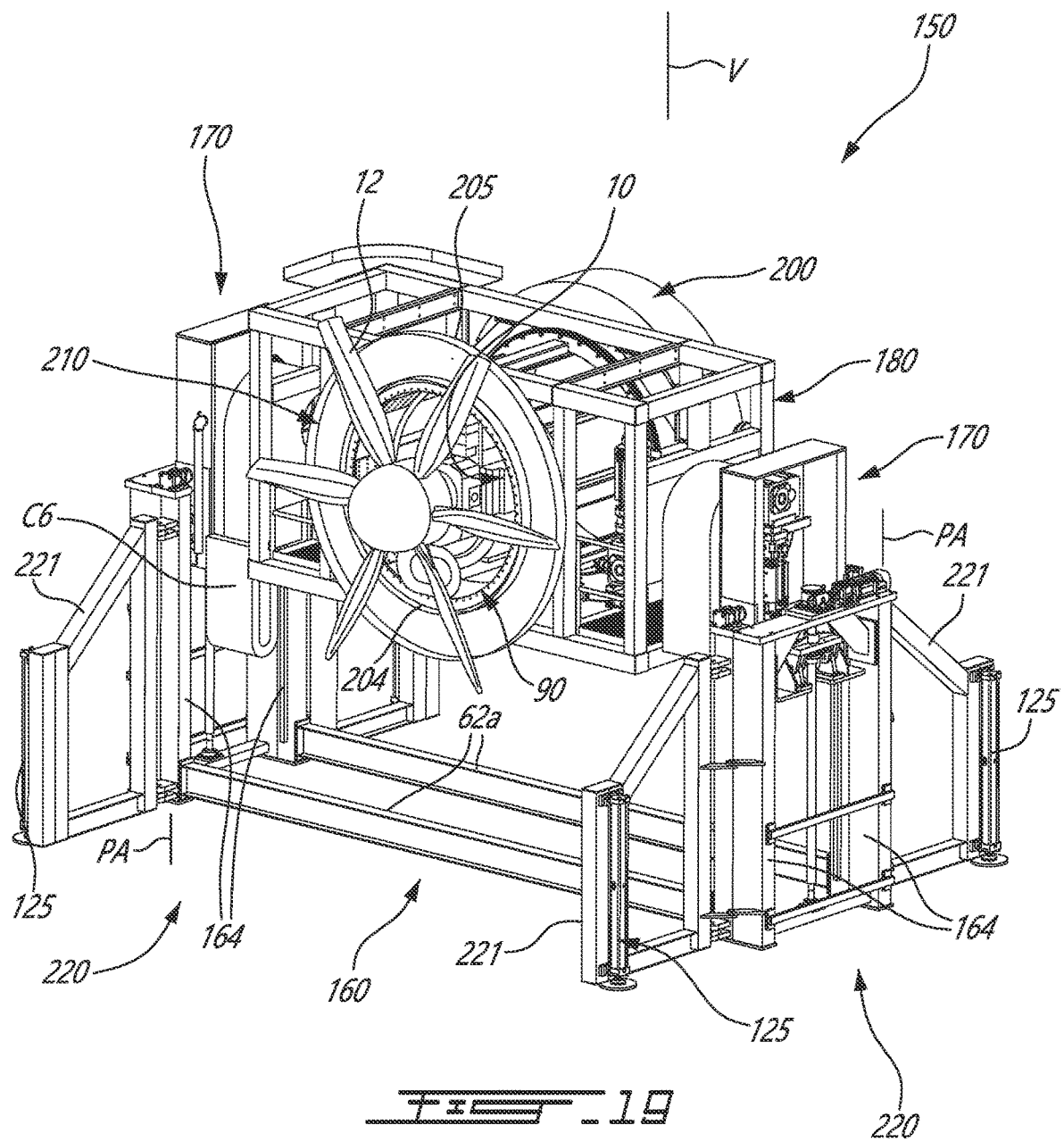
FIG. 19 is a front three dimensional view of a portable attitude test stand in accordance with another embodiment and shown in a test configuration.

Referring now to FIG. 19, another embodiment of a portable attitude test stand is shown at 150. For the sake of conciseness, only elements that differ from the test stand 50 of FIG. 5 are described herein below.

The pitch frame 180 of this second embodiment of the PATS 150 has two shaft portions, as for the pitch frame 80 of FIG. 10. However, the two shaft portions of the pitch frame 180 are of the same length instead of being of different length.

In the embodiment shown, the lifting system 220 includes four pivotable outriggers 221 each pivotably mounted to a respective one of the four vertical frame members 164 of the support frame 160. The four pivotable outriggers 221 are pivotable about respective pivot axes PA each being parallel to the vertical axis V. The pivotable outriggers 221 are pivotable between an extended configuration shown in FIG. 19 and a retracted configuration shown in FIG. 22. In the retracted configuration, the pivotable outriggers 221 lay parallel and adjacent to the longitudinal frame members 62a of the support frame 160.

Any suitable means used to pivot the pivotable outriggers 221 are contemplated without departing from the scope of the present disclosure. For instance, the pivotable outriggers 221 may be manually moved by a user. Stoppers 222 (FIG. 20) are used to limit rotation of the outriggers 221 when said outriggers 221 define an angle of about 90 degrees with the longitudinal frame members 62a of the support frame 160. Locking pins may be engage the stoppers 222 to lock the pivotable outriggers 221 into their extended configuration.

Figure 20:
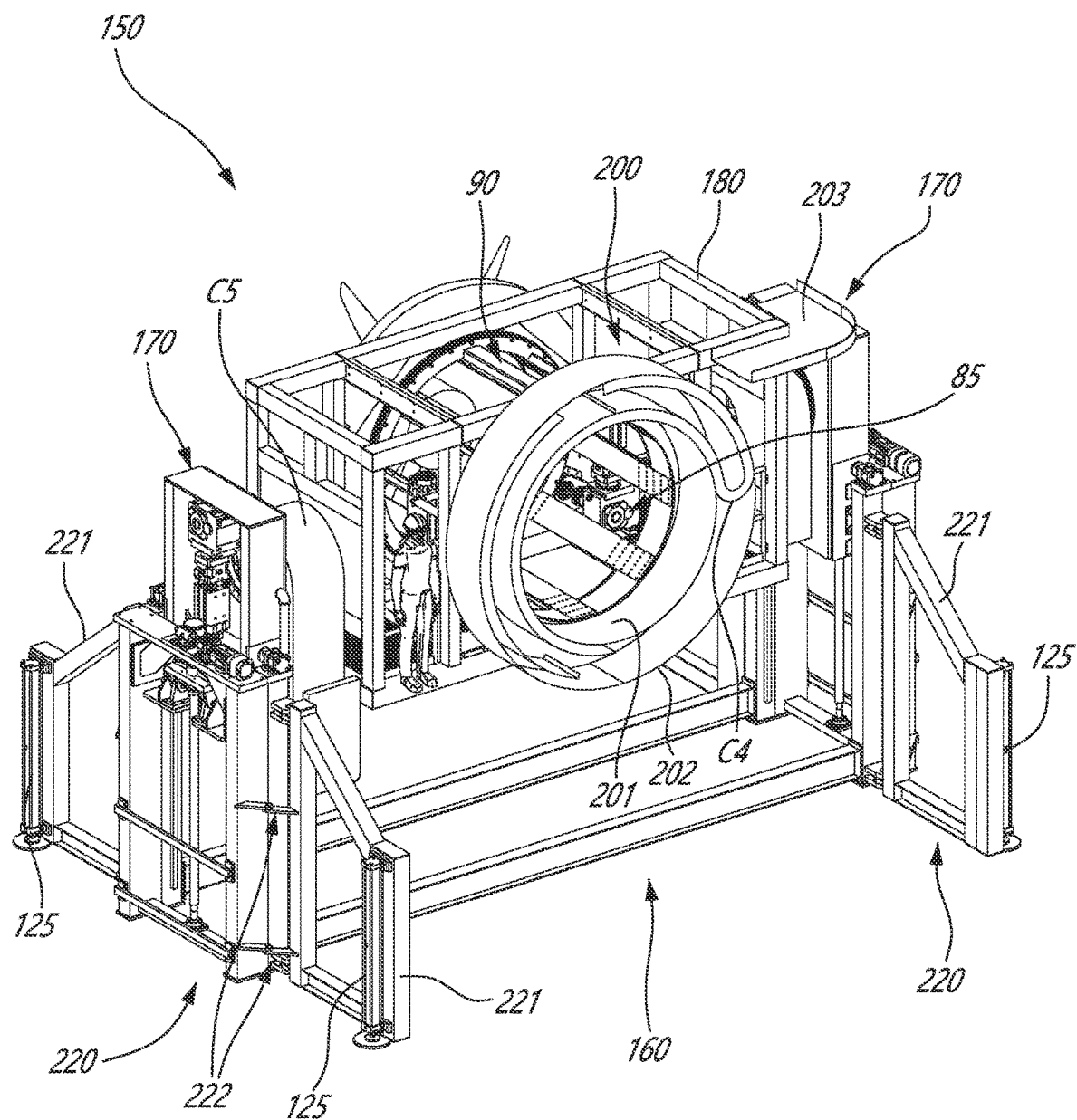
FIG. 20 is a rear three dimensional view of the portable attitude test stand of FIG. 19.

Referring to FIG. 20, the cable management system 200 includes an inner annular wall 201 and an outer annular wall 202. The inner annular wall 201 is secured to the roll cage 90 for rotation therewith upon movements of the engine 10 about the roll axis R (FIG. 1). The outer wall 202 is secured to the pitch frame 80 and extends around the inner wall 201. The roll cage 90 is rotatable relative to the outer wall 202 of the cable management system 200. Cables C4 are secured at first ends to the inner wall 201 and at their opposite second ends to the outer wall 202. An excess length of cable is contained between the inner and outer walls 201, 202 such that, in use, when the roll cage 90 rotates, the first ends of the cables C4 are movable relative to the second ends to follow movements of the roll cage 90. In the embodiment shown, the lengths of the cables C4 contained between the inner and outer walls 201, 202 are such that the first ends of the cables C4 may be located diametrically opposed to their second ends to allow the engine 10 to rotate by 180 degrees.

The cable management system 200 further includes cables C5, C6 on opposite sides of the pitch frame 180 each being partially wrapped around shaft members of the pitch frame 80. This system allows the cables C5, C6 to follow pitching movements of the pitch frame 80 as explained above with reference to FIG. 12.

As shown more particularly on FIG. 20, a cable guide 203 is secured to the pitch frame 180 and is used for supporting cables (not shown) connecting the cables C6 to the cables C4.

Referring more particularly to FIG. 19, the cable management system 200 further includes a front inner annular wall 204 and a front outer annular wall 205. The front inner annular wall 204 is secured to the roll cage 90 for rotation therewith upon movements of the engine 10 about the roll axis R (FIG. 1). The front outer annular wall 205 is secured to the pitch frame 180. As explained above, cables C7 (FIG. 21) has a first end secured to the front inner annular wall 204 and a second end secured to the front outer annular wall 205. An excess length of cable is contained between the two front annular walls 204, 205 to allow movements of the roll cage 90 relative to the pitch frame 180. The cable located between the front annular walls 204, 205 may be connected to the cables C6 that are wrapped around one of the two shaft portions of the pitch frame 180. In the embodiment shown, the cables C4 and C5 are used for connecting measuring instruments whereas the cables C6 and the cables C7 contained between the front annular walls 204, 205 are used for power. Separating the instrument cables C4, C5 and the power cables C6, C7 may avoid exposing the instrument cables C4, C5 to a magnetic field generated by the power cables C6, C7. This may avoid faulty measurements.

Figure 21:
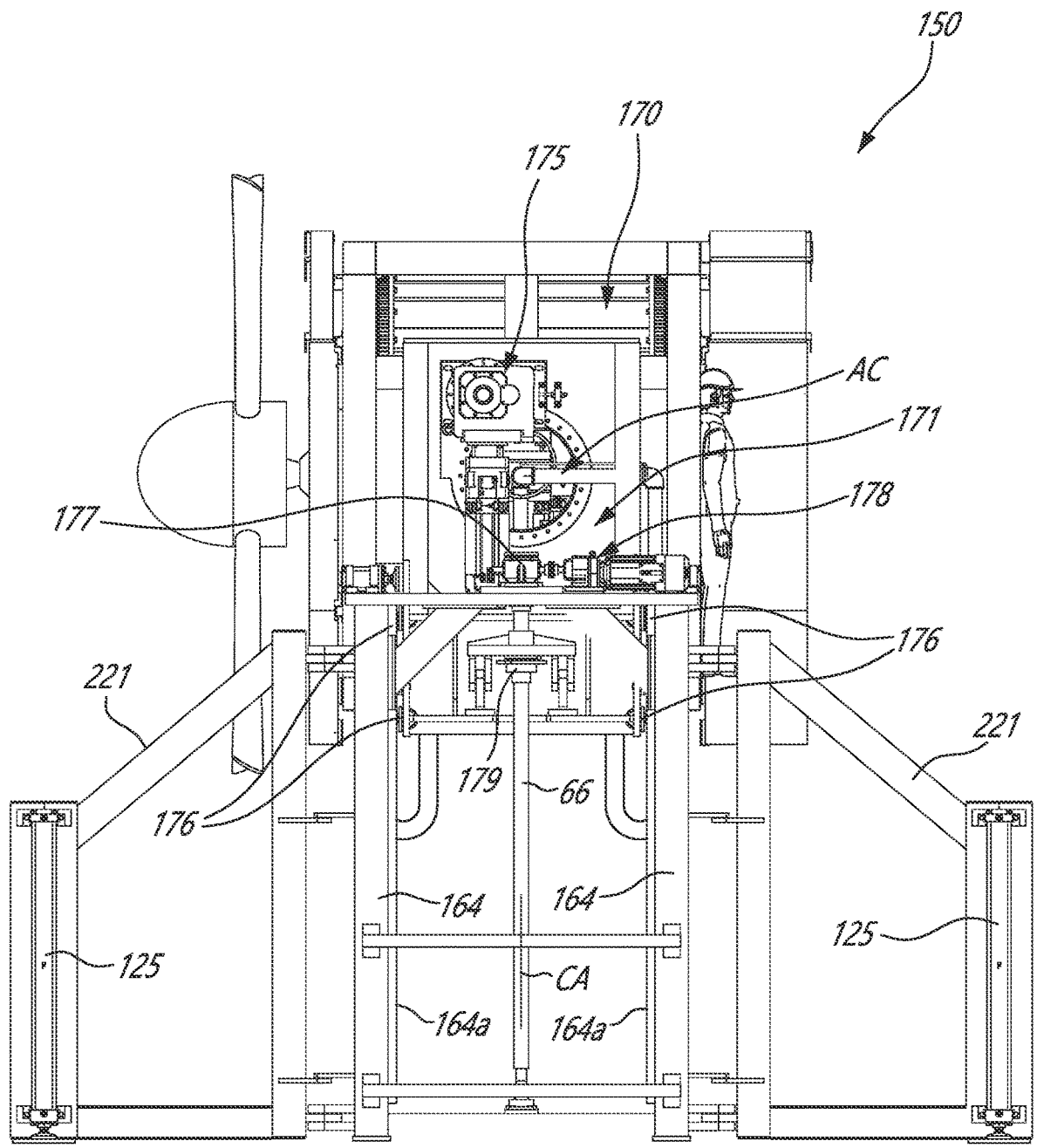
FIG. 21 is a side view of the portable attitude test stand of FIG. 19.

Referring more particularly to FIG. 21, the PATS 150 includes two carriages 170 and two actuators 171 used to carry the pitch frame 180 and roll cage 90 up and down along the vertical frame members 164 of the support frame 160.

In the embodiment shown, each of the two actuators 171 includes a threaded rod 66 disposed between two corresponding ones of the four vertical frame members 164 of the support frame 160, a motor 178 (e.g., electric motor) secured to the support frame 160, on top of the vertical frame members 164 in the embodiment shown, a gearbox 177 drivingly engaged to the motor 178 and secured to the support frame 160, and a threaded member 179 threadingly engaged to the threaded rod 66 and connected to the carrier 170. In the present embodiment, the threaded rods are pivotable about respective central axes CA.

Each of the two motors 178 is in driving engagement with a respective one of the two threaded rods 66 via the gearboxes 177. Upon actuation, the motors 178 transmit rotational inputs to the threaded rods 66 that are threadingly engaged with the threaded members 179. Rotation of the threaded rods 66 induces translation of the threaded members 179 and of the carriages 170 along the central axes CA of the threaded rods 66 to change a height of the pitch frame 180, roll cage 90, and engine 10 secured within the roll cage 90 as discussed herein above. The motors 178, the threaded rods 66, and the threaded members 179 act as actuators to lift the test cell. Any other suitable actuators may be used without departing from the scope of the present disclosure.

As shown in FIG. 21, each of the carriages 170 has a step motor 175 secured thereto. As described above with reference to FIGS. 8-9, the step motors 175 are used to rotate the pitch frame 180 about the pitch axis P (FIG. 1) of the engine 10.

In the embodiment shown, each of the vertical frame members 164 has a rail 164a secured thereto. The two carriages 170 have pulleys 176 rotatably mounted thereto. The pulleys 176 are rollingly engaged to the rails 164a of the vertical frame members 164 to allow smooth upward and downward motions of the carriages 170 relative to the support frame 160.

Still referring to FIG. 21, the PATS 150 includes an air conduit AC connectable to an air starter (not shown) of the gas turbine engine 10 and to a source of compressed air. The air conduit AC is therefore used for starting the gas turbine engine 10 for carrying the attitude test.

Figure 22:
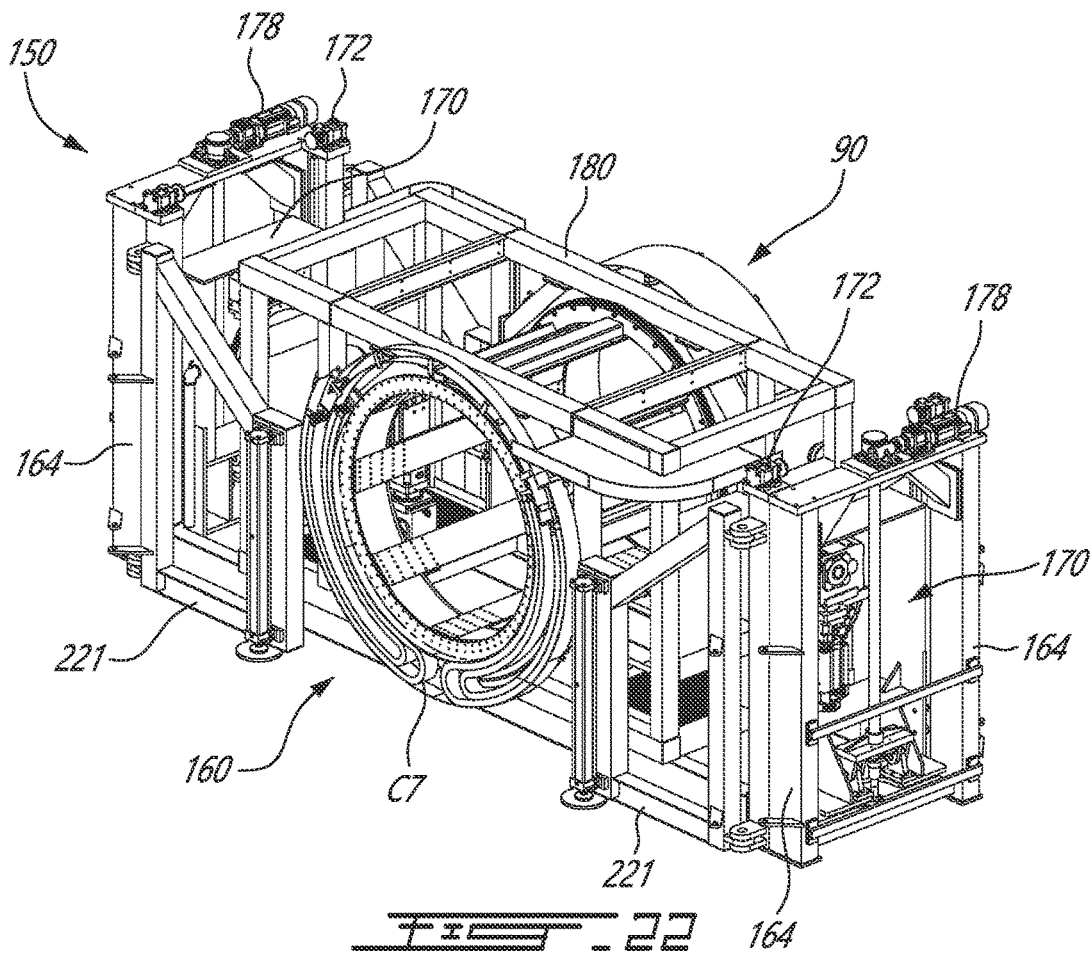
FIG. 22 is a front three dimensional view of the portable attitude test stand of FIG. 19 shown in a transport configuration.
Figure 23:
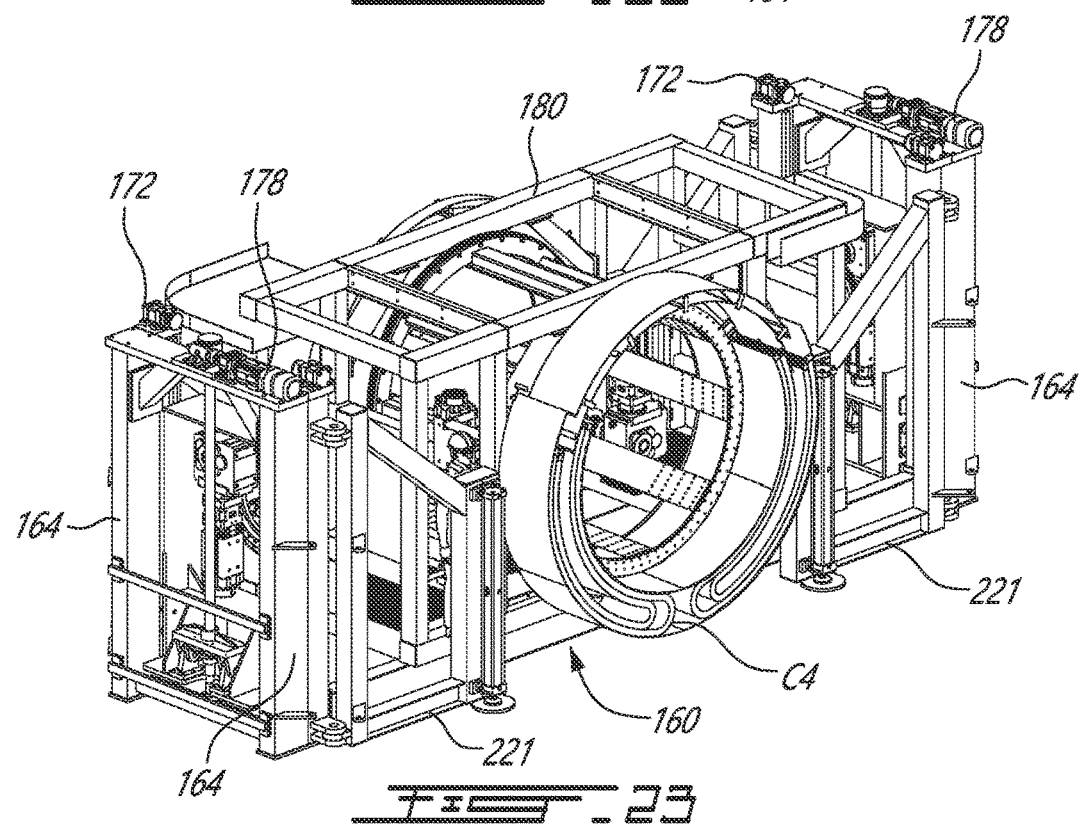
FIG. 23 is a rear three dimensional view of the portable attitude test stand of FIG. 19 in the transport configuration.

As shown in FIG. 22, the PATS 150 includes two actuated locking pins 172 secured on top of the vertical frame members 164. The locking pins 172 may be actuated upon the PATS 150 in its test configuration to lock the carriages 170 relative to the vertical frame members 164 of the support frame 160 for safety purposes.

Referring now to FIG. 24, another embodiment of a PATS is shown at 250. The PATS 250 includes the test cell TC secured to the support frame 260 via two carriages 270. The support frame 260 includes a base 262 mountable on the flat bed portion B of the trailer C and two vertical members 264 protruding from the base 262. Each of the two carriages 270 defines an opening slidably receiving a respective one of the two vertical members 264 of the support frame 260. Any suitable actuators may be used to engage the vertical frame members 264 to the carriages 270 to move the test cell TC between the transport and test heights. Rack and pinion gears may for instance be used.

The disclosed PATS 50, 150, 250 may improve ergonomics by allowing operators to work at ground level, as well as, year round testing in more favorable climates. The PATS 50, 150, 250 may be deployable on suitable airport properties.

The PATS 50, 150, 250 may be capable to test gas turbine engines of any kind (e.g., turbofan, turboshaft, turboprop, auxiliary power unit).

The disclosed PATS 50, 150, 250 may secure, maintain and enhance attitude testing capabilities. Full engine testing, improved ergonomics, engine access and handling, simultaneous pitch and roll motion and year round operation may be possible with the disclosed PATS 50, 150, 250. The disclosed PATS 50, 150, 250, by being movable, may address the risks associated with the non-movable facilities noise emissions, environment health and safety issues, and equipment obsolescence.

The PATS 50, 150, 250 may remain assembled for transport. The PATS 50, 150, 250 may offer ease of mobility to transport to different sites within North America. Cranes and/or heavy lifting equipment are not required to setup the PATS 50, 150, 250.

It will be appreciated that the PATS 50, 150 may be secured to the trailer C and may remain on the trailer C during the attitude test. In some cases, when the PATS 50, 150 remain on the trailer C during testing, actuators, such as hydraulic actuators, may extend laterally from the trailer to lift the trailer C, and the PATS 50, 150 off the ground during testing for increased stability.

For preparing the aircraft engine 10 for the attitude test, the trailer C and the portable attitude test stand (PATS) 50, 150, 250 mounted on the trailer C are transported from a first site to a second site. The test cell TC of the PATS 50, 150, 250 has a transport height during the transporting. At the second site, the height of the test cell TC of the PATS 50, 150, 250 is increased from the transport height to the test height greater than the transport height. The test height is selected to allow pitch movements of the aircraft engine 10, 10*a*.

In the embodiment shown, the increasing of the height includes unloading the PATS 50, 150, 250 from the trailer C before the increasing of the height. The increasing of the height includes in the present embodiment moving the test cell TC of the PATS 50, 150, 250 relative to the support frame 60, 160, 260 of the PATS 50, 150, 250 with the actuator(s) 71, 171 engaged to the support frame and the test cell TC.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A portable attitude test stand (PATS) for an aircraft engine, comprising:
    a support frame mountable on a trailer of a road vehicle, the support frame including a base and vertical members protruding from the base, two carriages movably engaged to the vertical members of the support frame;
    a test cell supported by the support frame and sized to receive the aircraft engine, the test cell operable to rotate the aircraft engine about a pitch axis and a roll axis of the aircraft engine, the test cell operatively connected to instrumentations to evaluate effects of flight attitudes of the aircraft engine on fluid systems of the aircraft engine, the test cell supported by the support frame via the carriages, the carriages movable relative to the vertical members to vary a height of the test cell between a test height and a transport height; and
    an actuator operatively connected to the test cell and to the support frame, the actuator operable to lower and raise the test cell relative to the support frame between a transport configuration in which the test cell has the transport height and a test configuration in which the test cell has the test height, the test height being greater than the transport height.

2. The PATS of claim 1, wherein the actuator includes two actuators each engaged to a respective one of the two carriages and to the support frame.

3. The PATS of claim 1, comprising two shaft members secured to the test cell, the two shaft members rollingly engaged to the two carriages, a step motor secured to one of the two carriages and in driving engagement with a corresponding one of the shaft members for rotating the test cell about the pitch axis of the aircraft engine.

4. The PATS of claim 1, wherein the actuator includes two actuators, each of the two actuators including a first motor secured to a respective one of the two carriages and a threaded member in driving engagement with the first motor, the threaded member threadingly engaged to a threaded rod secured to the base and extending vertically away from the base, rotation of the threaded members by the first motors inducing translation of the threaded members and the two carriages relative to the vertical members of the frame.

5. The PATS of claim 1, wherein the actuator includes two actuators, each of the two actuators including a first motor secured to the frame and a threaded rod in driving engagement with the first motor and extending vertically away from the base, the threaded rod threadingly engaged to a threaded member secured to a respective one of the two carriages, rotation of the threaded rods by the first motors inducing translation of the threaded members and of the two carriages relative to the vertical members of the frame.

6. The PATS of claim 1, wherein the test stand includes a pitch frame and a roll cage rotatably received within the pitch frame, the roll cage sized to receive the aircraft engine, the PATS including a cable management system having:
    a first annular wall secured to the roll cage and extending around the roll axis,
    a second annular wall secured to the pitch frame and extending around the first annular wall, and
    cables having first ends secured to the first annular wall and second ends secured to the second annular wall, the cables located between the first and second annular walls, lengths of the cables selected to allow rotation of the first annular wall relative to the second annular wall about the roll axis.

7. The PATS of claim 1, wherein dimensions of the support frame are selected to be contained within a footprint of a flatbed portion of the trailer.

8. The PATS of claim 1, wherein the transport height extends from a ground to a most elevated point on the test cell, the transport height less than 14 feet when the test cell is mounted on the trailer.

9. The PATS of claim 1, wherein the test height is such that a clearance remains between the aircraft engine and a ground for a pitch angle of the aircraft engine varying from 90 to −90 degrees, the pitch angle defined between a central axis of the aircraft engine and the ground.

10. The PATS of claim 1, wherein a base of the support frame is defined by the trailer.

11. The PATS of claim 1, wherein the test cell includes a pitch frame and a roll cage rotatably received within the pitch frame, the roll cage sized to receive the aircraft engine, two shaft members secured to the pitch frame and protruding away therefrom, each of the two shaft members rollingly engaged to a respective one of the two carriages.

12. The PATS of claim 11, comprising a first motor secured to one of the two carriages and in driving engagement with one of the two shaft members for rotating the pitch frame about the pitch axis.

13. The PATS of claim 12, comprising a second motor secured to the pitch frame and in driving engagement with the roll cage for rotating the roll cage about the roll axis.

14. A portable attitude test stand (PATS) for an aircraft engine, comprising:
   a support frame mountable on a trailer of a road vehicle;
   a test cell supported by the support frame and seized to receive the aircraft engine, the test cell operable to rotate the aircraft engine about a pitch axis and a roll axis of the aircraft engine, the test cell operatively connected to instrumentations to evaluate effects of flight attitudes of the aircraft engine of fluid systems of the aircraft engine;
   an actuator operatively connected to the test cell and to the support frame, the actuator operable to lower and raise the test cell relative to the support frame between a transport configuration in which the test cell has a transport height and a test configuration in which the test cell has a test height, the test height being greater than the transport height; and
   outriggers secured to the support frame and lifting actuators secured to distal ends of the outriggers, the outriggers movable relative to the support frame between a retracted configuration and an extended configuration, a distance between the lifting actuators in a direction transverse to a direction of travel of the trailer is greater in the extended configuration than in the retracted configuration, in the extended configuration the lifting actuators operable to engage a ground to lift the support frame off the trailer.

15. The PATS of claim 14, wherein the outriggers are pivotable relative to the support frame between the retracted configuration and the extended configuration.

16. The PATS of claim 14, wherein the lifting actuators includes two pairs of lifting actuators, distances in the direction transverse to the direction of travel between the lifting actuators of each pairs of lifting actuators is at most a width of the trailer when the outriggers are in the retracted configuration.

17. A method of preparing an aircraft engine for an attitude test, comprising:
   transporting a trailer and a portable attitude test stand (PATS) mounted on the trailer from a first site to a second site, a test cell of the PATS having a transport height during the transporting, the test cell having a pitch frame and a roll cage rotatably received within the pitch frame;
   at the second side, unloading the PATS from the trailer; and
   at the second site and after the unloading of the PATS from the trailer, increasing a height of a test cell of the PATS from the transport height to a test height greater than the transport height, the test height selected to allow pitch movements of the aircraft engine.

18. The method of claim 17, wherein the increasing of the height includes moving the test cell of the PATS relative to a support frame of the PATS with an actuator engaged to the support frame and the test cell.

* * * * *